(12) United States Patent
Pasquero et al.

(10) Patent No.: US 9,094,358 B2
(45) Date of Patent: Jul. 28, 2015

(54) SYSTEM AND METHOD FOR SENDING DATA INDIRECTLY TO A RECIPIENT USING ANOTHER DEVICE

(75) Inventors: Jerome Pasquero, Kitchener (CA); David Ryan Walker, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 892 days.

(21) Appl. No.: 12/725,539

(22) Filed: Mar. 17, 2010

(65) Prior Publication Data

US 2011/0231494 A1 Sep. 22, 2011

(51) Int. Cl.
*G06F 15/16* (2006.01)
*H04L 12/58* (2006.01)

(52) U.S. Cl.
CPC ............... *H04L 51/32* (2013.01); *H04L 51/14* (2013.01); *H04L 51/28* (2013.01); *H04L 51/30* (2013.01)

(58) Field of Classification Search
USPC ........................................................ 709/206
See application file for complete search history.

(56) References Cited

U.S. PATENT DOCUMENTS

| | | | |
|---|---|---|---|
| 6,868,392 B1 * | 3/2005 | Ogasawara | 705/7.25 |
| 6,993,327 B2 | 1/2006 | Mathis | |
| 2001/0054115 A1 * | 12/2001 | Ferguson et al. | 709/248 |
| 2002/0023138 A1 * | 2/2002 | Quine et al. | 709/206 |
| 2002/0026483 A1 * | 2/2002 | Isaacs et al. | 709/206 |
| 2003/0120805 A1 | 6/2003 | Couts et al. | |
| 2005/0102368 A1 * | 5/2005 | Forman et al. | 709/207 |
| 2006/0265314 A1 | 11/2006 | Cabellero-McCann et al. | |
| 2007/0250483 A1 | 10/2007 | Blue et al. | |
| 2009/0234922 A1 | 9/2009 | Appelman | |
| 2010/0100370 A1 * | 4/2010 | Khouri et al. | 704/9 |

FOREIGN PATENT DOCUMENTS

| | | |
|---|---|---|
| WO | WO 03/098425 A1 | 11/2003 |
| WO | WO 2006/062546 A2 | 6/2006 |
| WO | WO 2006/066387 A1 | 6/2006 |

OTHER PUBLICATIONS

Austin Bunn articles; http://www.austinbunn.com/articles.php?tarqet+chainreaction.html; Available on the internet at least as early as Oct. 4, 2009.
Soholaunch; Calendar event confirmation—Website Builder Community Forum; http://forum.soholaunch.com/soholaunch-troubleshootinq-problems/8759-calendar-event-confirmation.html; Available on the internet at least as early as Oct. 4, 2009.
Jaedicke, Michael; Partial European Search Report; search completed Aug. 2, 2010.

\* cited by examiner

*Primary Examiner* — Angela Nguyen
(74) *Attorney, Agent, or Firm* — Fleit Gibbons Gutman Bongini & Bianco P.L.

(57) ABSTRACT

Contact information, such as an email address, may be known for some recipients, but may be unknown or out-of-date (or obsolete) for others. However, often a group of recipients are related to each other with potentially overlapping social networks. In such cases, data can be communicated directly to those recipients that are known or can otherwise be contacted directly, while relying on such "direct recipients" to act as one or more proxies for sending the data to the others in the group, e.g. using their local contact information. A server can also be used to provide updates to the originating device or provide access to the list as it evolves, to enable the originating device to see who has received the data even if they are unaware of how the data reached those other devices.

25 Claims, 17 Drawing Sheets

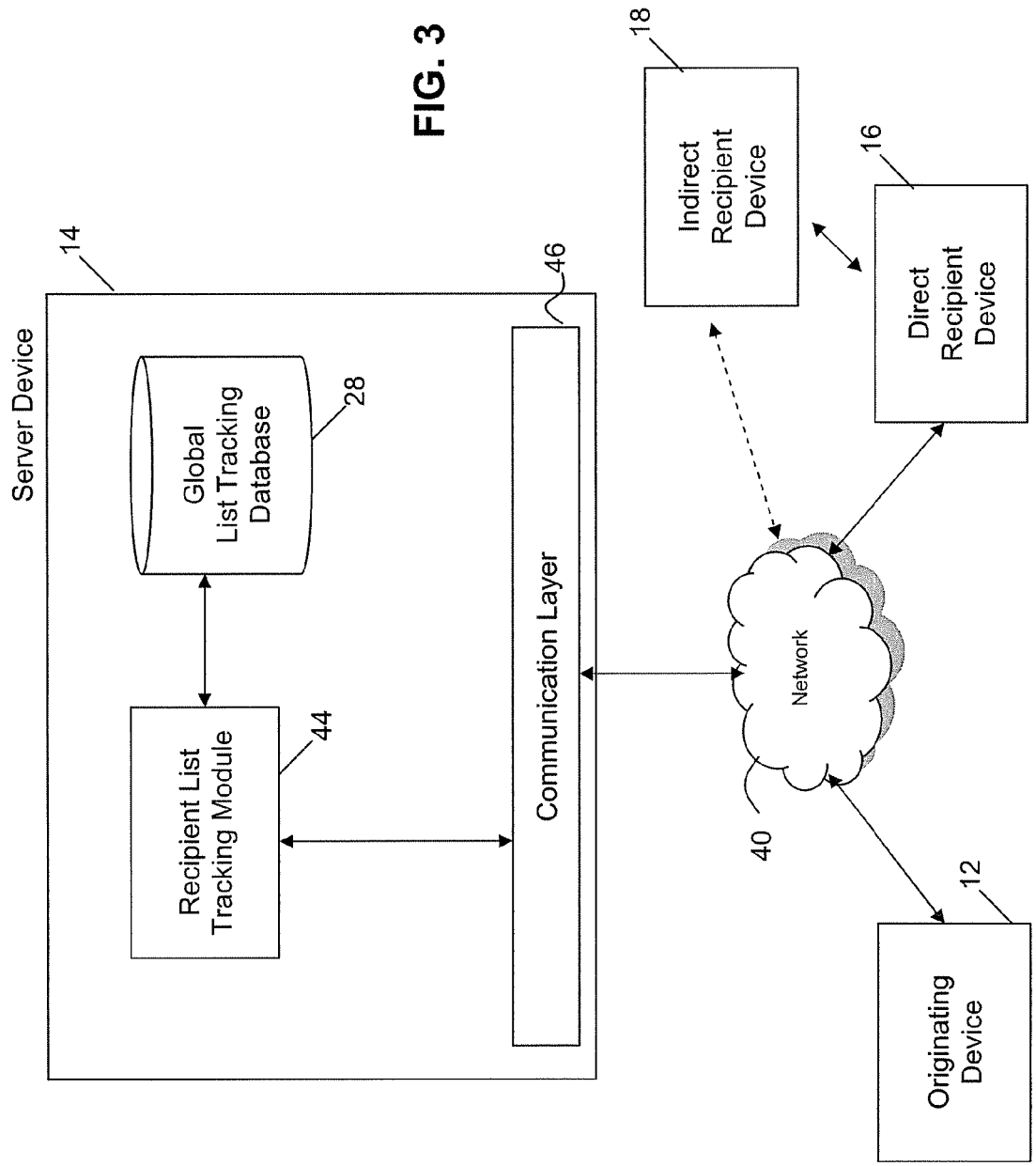

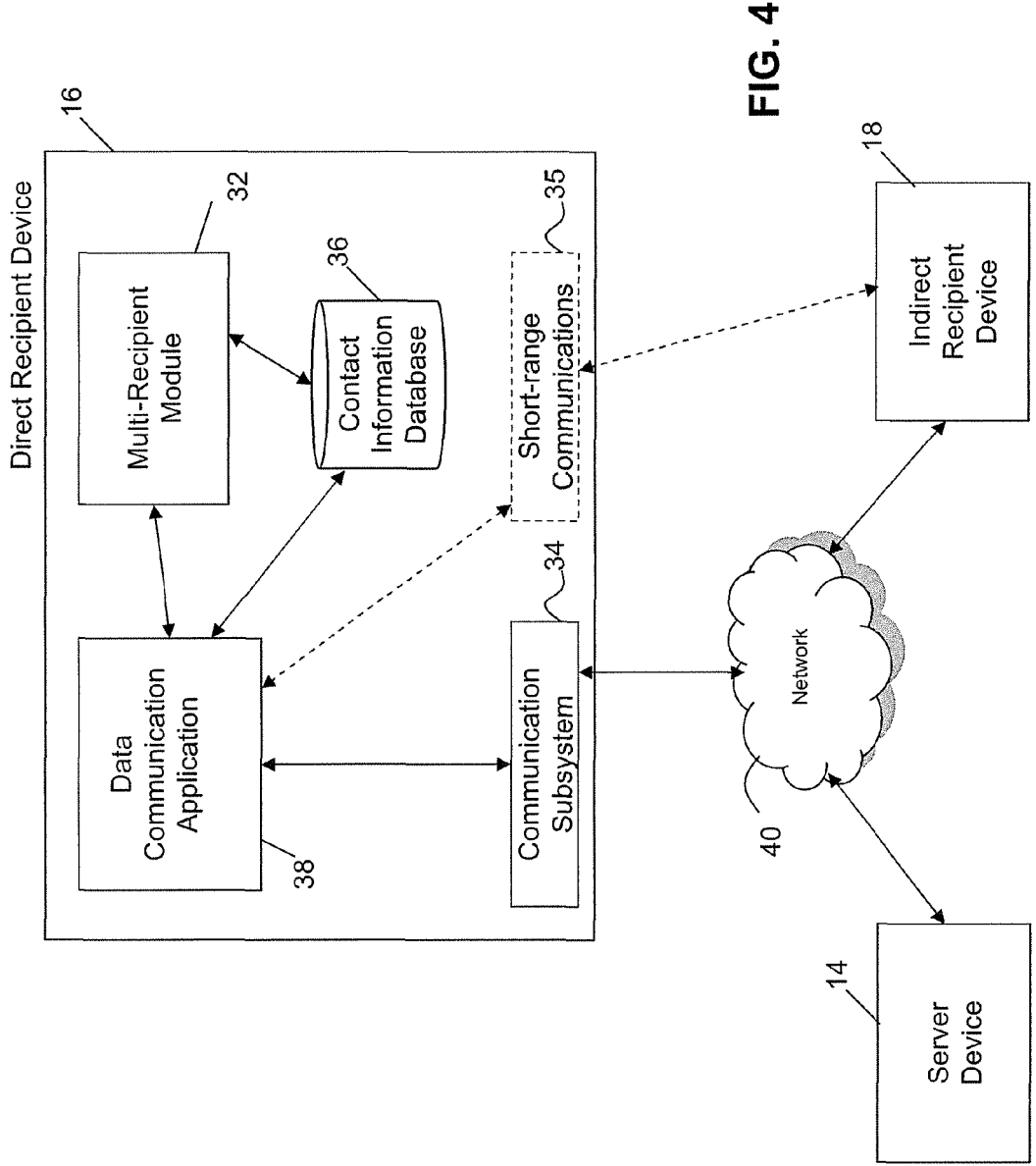

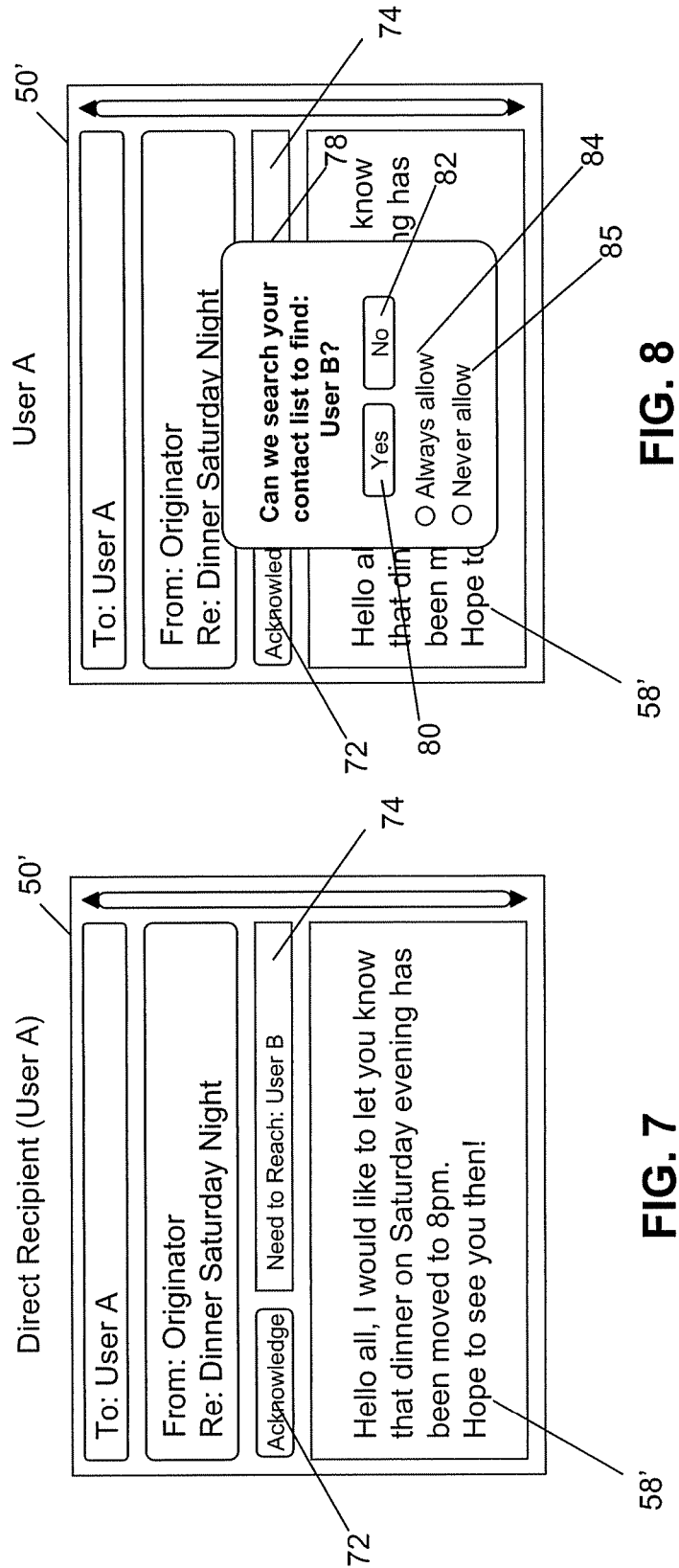

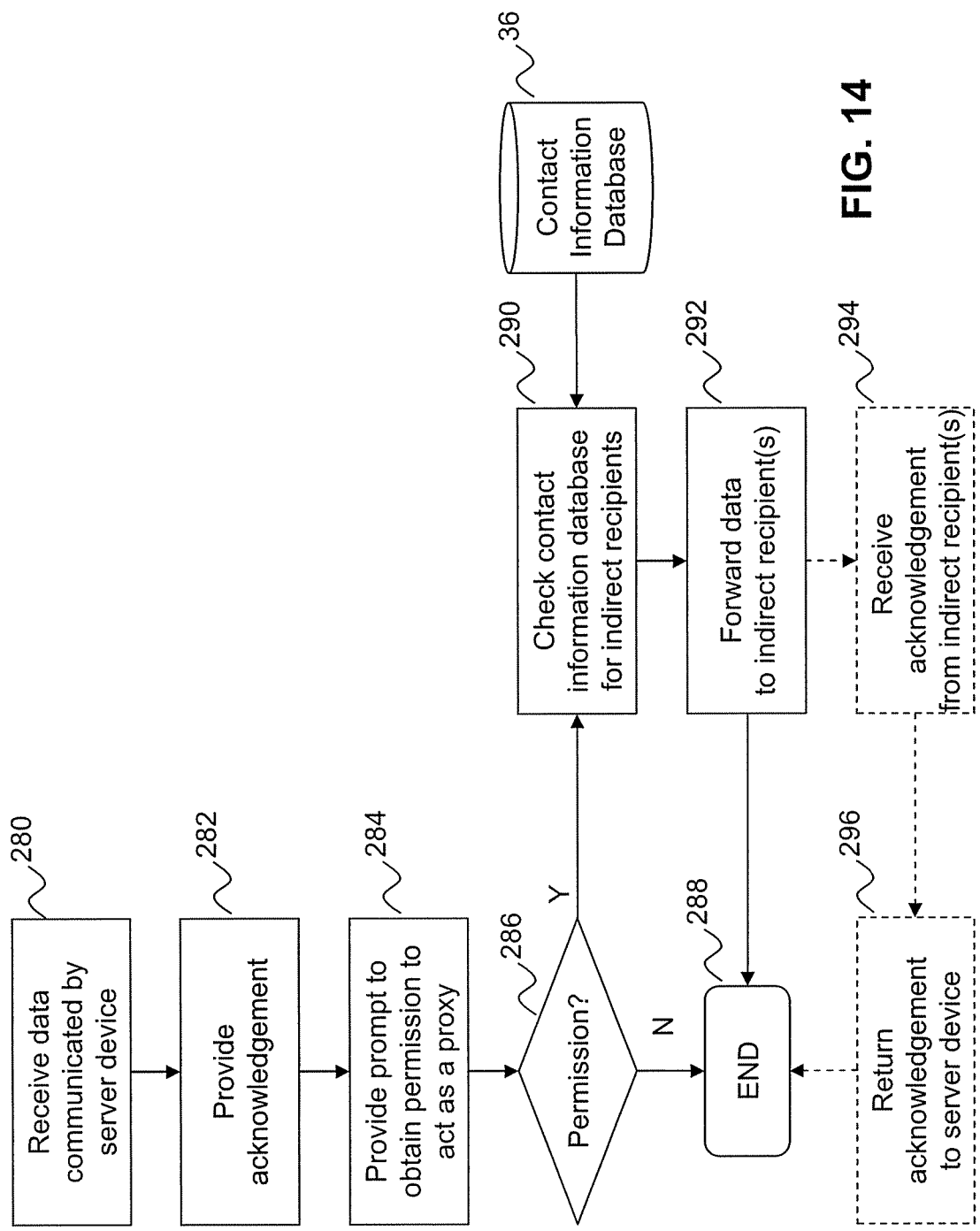

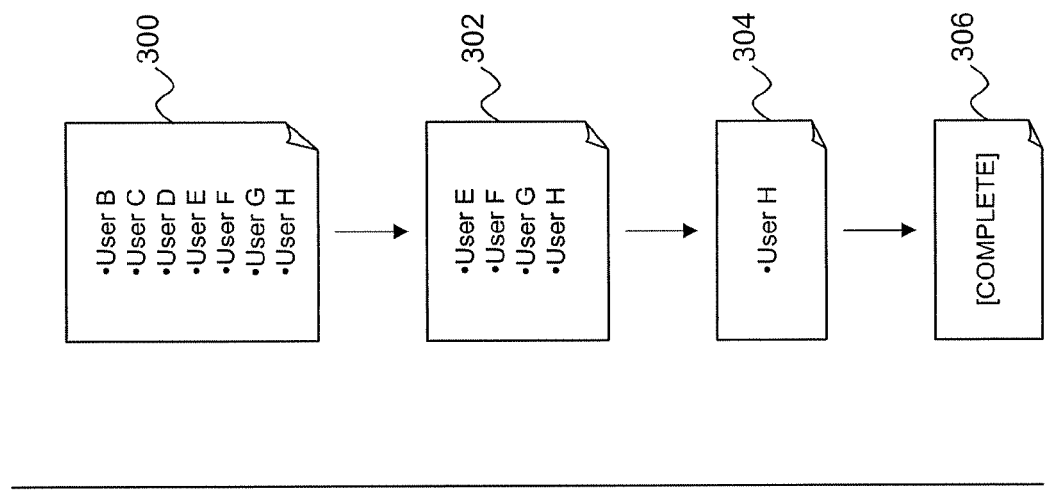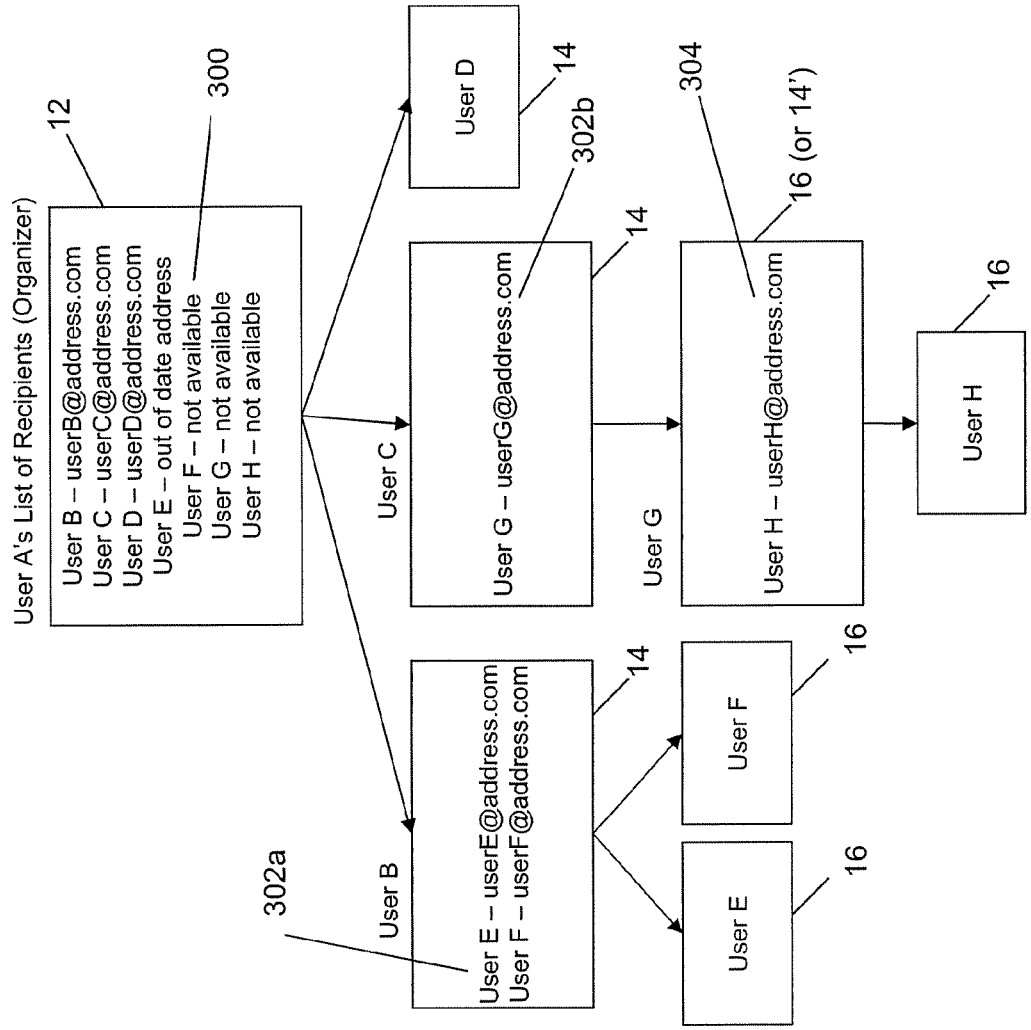
FIG. 15A

SYSTEM AND METHOD FOR SENDING DATA INDIRECTLY TO A RECIPIENT USING ANOTHER DEVICE

TECHNICAL FIELD

The following relates to systems and methods for sending data using another device.

BACKGROUND

Computing devices, in particular mobile data communication devices have become an important tool in communicating with others. For example, a device may be used to send email messages, text messages, instant messages, voice communications or other data to one or more recipient devices and associated recipients. In order to communicate with others, it is typically required that an address or other identifier be known for contacting each recipient. This enables an originating device to then prepare data to be sent, add addresses corresponding to one or more recipients to enable the recipients to receive the data, and send the data to the one or more recipients.

BRIEF DESCRIPTION OF THE DRAWINGS

Embodiments will now be described by way of example only with reference to the appended drawings wherein:

FIG. 3 is an example block diagram showing further detail of the server device of FIG. 1.

FIG. 4 is an example block diagram showing further detail of the direct recipient device shown in FIG. 1.

FIG. 7 is an example screen shot of a received email message sent by the originating device.

FIG. 8 is an example screen shot of a permission prompt for accessing contact information in the direct recipient device for sending data to an indirect recipient device.

FIG. 14 is an example set of computer executable instructions performed in forwarding a data communication to an indirect recipient and acknowledging receipt of the data communication for updating the originating device.

FIG. 15A is an example flow diagram showing an example list update process for an email communication sent to a list of recipients both directly and indirectly.

DETAILED DESCRIPTION OF THE DRAWINGS

When sending data to multiple recipients, e.g. to a large group, it can be difficult to obtain the necessary contact information for each intended recipient. Although the contact information, such as an email address, may be known for some recipients, it may be unknown or out-of-date (or obsolete) for others. Often a group of recipients are related to each other with potentially overlapping social networks. In such cases, it has been realized that the data can be communicated directly to those recipients that are known or can otherwise be contacted directly, while relying on such "direct recipients" to act as one or more proxies for sending the data to the others in the group, e.g. using their local contact information. Also, by utilizing an intermediary server for maintaining the list of recipients, the device that sends the original data does not need to see contact information for the others in the group and thus privacy can be preserved. The server can also be used to provide updates to the originating device or provide access to the list as it evolves, to enable the originating device to see who has received the data even if they are unaware of how the data reached those other devices.

Figure 1:
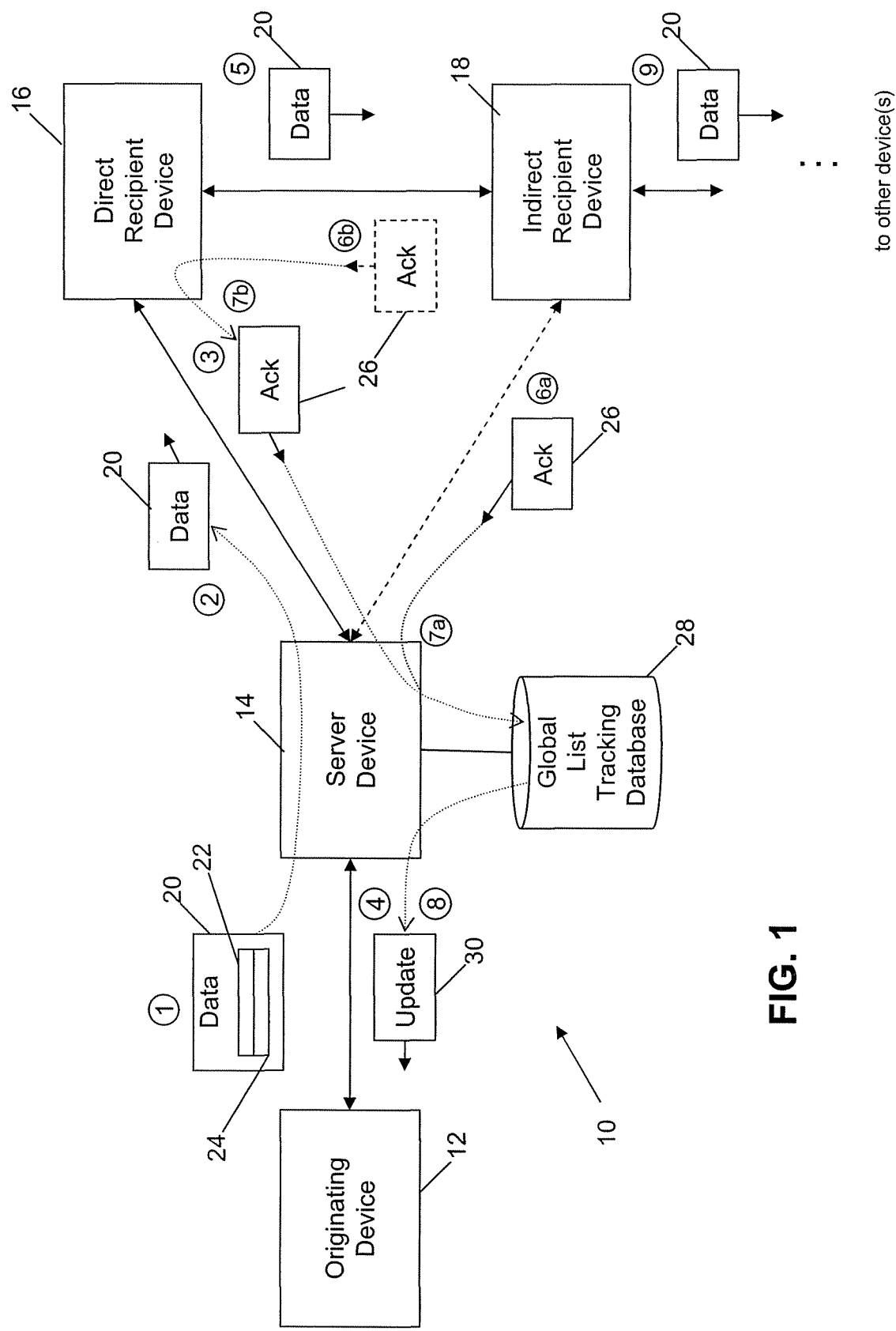
FIG. 1 is an example schematic diagram of a data communication system for sending data to an indirect recipient through a direct recipient.

Turning now to FIG. 1, an example data communication system 10 is shown. The system 10 in this example comprises an originating device 12 that is communicably connectable to a server device 14 for sending data 20 within the system 10. It can be appreciated that the system 10 may comprise or form part of any suitable network infrastructure, whether existing or ad-hoc (e.g. via a short-range communications protocol) as is well known in the art, and is illustrated as shown in FIG. 1 for discussion purposes only. In this example, the server device 14 is also communicably connectable to a direct recipient device 16. The direct recipient device 16 is configured to communicate with an indirect recipient device 18, which can be done via the server device 14 as reflected by the dashed line or through some other communication medium (not shown). For the purpose of this example, a device is a direct recipient device 16 when the originating device 12 is able to communicate directly with that device. In other words, the originating device 12 possesses or has access to a current and valid address or identifier that enables data 20 to be sent from the originating device 12 to the direct recipient device 16, e.g. via the server device 14. An indirect recipient device 18 on the other hand, for the purpose of this example, is one that the originating device 12 may know exists, however, that originating device 12 does not at that time possess or have access to an address or identifier that would enable it to communicate with that device directly. For ease of explanation, any data, information, identifier, or address that enables data 20 to be sent to a device will hereinafter be referred to commonly as an "address".

The data 20 may represent anything capable of being transmitted from one device to another device. Examples include, without limitation, messages such as email, text messages, instant messages, notifications, announcements, as well as other types of data such as calendar information, advertisements, statistical information, news feeds, etc.

It can be appreciated that although only one direct recipient device 16 and one indirect recipient device 18 are shown in FIG. 1, any zero or more of each may exist at any given time. Also, any device that is configured to communicate within the system 10 (or a different system (not shown) that can in turn enable communication with a device within the system 10), can be an originating device 12, direct recipient device 16, or indirect recipient device 18 depending on the circumstances. Also, the direct and indirect recipient devices 16, 18 may also be referred to herein as first and second recipient devices to distinguish from one another.

In the example shown in FIG. 1, in order to track and manage a list of recipients that the originating device 12 wishes to ultimately contact (either directly or indirectly), the server device 14 comprises or has access to a global list tracking database 28. Such lists may be provided to or generated by the server device 14 when the originating device 12 sends data 20 comprising at least one direct recipient identifier 22, and at least one indirect recipient identifier 24. It can be appreciated that the direct recipient identifier 22 includes addresses associated with respective direct recipient devices 16, e.g. email addresses. The indirect recipient identifiers 24 may comprise any data or information that can be used to identify respective indirect recipients 18 such that an associated address can be found.

For example, the data flow shown in FIG. 1 illustrates an originating device 12 sending the data 20 at stage 1 via the server device 14. The data 20 is sent directly to the direct recipient device 16 at stage 2. In this example, the server device 14 maintains a global list associated with the data 20 being sent in stages 1 and 2 and an acknowledgement (ACK) 26 is returned by the direct recipient device 16 at stage 3 upon receipt of the data 20 to enable the server device 14 to update the global list tracking database 28. In some embodiments, an update 30 is sent from the server device 14 to the originating device 12 at stage 4. The update 30 is used to display to a user of the originating device 12 an indication of any successful deliveries of the data 20.

By including an indirect recipient identifier 24 corresponding to the indirect recipient device 18 in the data 20, if the direct recipient device 16 possesses an address for the indirect recipient device 18, the direct recipient device 16 can use such an address to send the data 20 to the indirect recipient device 18 at stage 5. If the indirect recipient device 18 is communicably connectable to the server device 14, an ACK 26 may be sent directly to the server device 14 at stage 6a. In other embodiments, the indirect recipient device 18 can rely on its connection to the direct recipient device 16, if necessary, to provide an ACK 26 at stage 6b. In other words, the indirect recipient device 18 may use any available communication medium to return an ACK 26 to the server device 14 and thus the originating device 12. In either case, the server device 14 obtains an ACK 26 indicating that the indirect recipient device 18 received data 20, either directly at stage 7a, or indirectly via the direct recipient device 16 at stage 7b. The server device 14 sends an update 30 to the originating device 12 at stage 8 and updates its global list tracking database 28.

In this way, if the server device 14 determines that all recipients identified in the data 20 (both in direct recipient identifiers 22 and in indirect recipient identifiers 24) have received the data 20, it provides an update 30 to the originating device 12 to indicate the successful delivery of the data 20 to all those listed in the intended group of recipients.

As can be appreciated from FIG. 1, the indirect recipient device 18 can also act as a proxy for communicating the data 20 to other indirect recipient devices 18 (not shown). Also, more than one direct recipient device 16 may receive the initial data communication and only one is shown for ease of explanation. It can also be appreciated that the ACKs 26 and updates 30 can be sent via any suitable communication medium. As is well known in the art, various distinct data communication infrastructures, networks, and services can be configured to interface with each other, even across different network types and in different jurisdictions, and such detail is omitted for clarity. As will be discussed below (see also FIG. 16), although the server device 14 is used in this example to track and maintain a list of recipients for particular data 20, the functionality of the server device 14 can be implemented on any other suitable device, for example, directly on the originating device 12 and/or direct recipient device 16.

Figure 2:
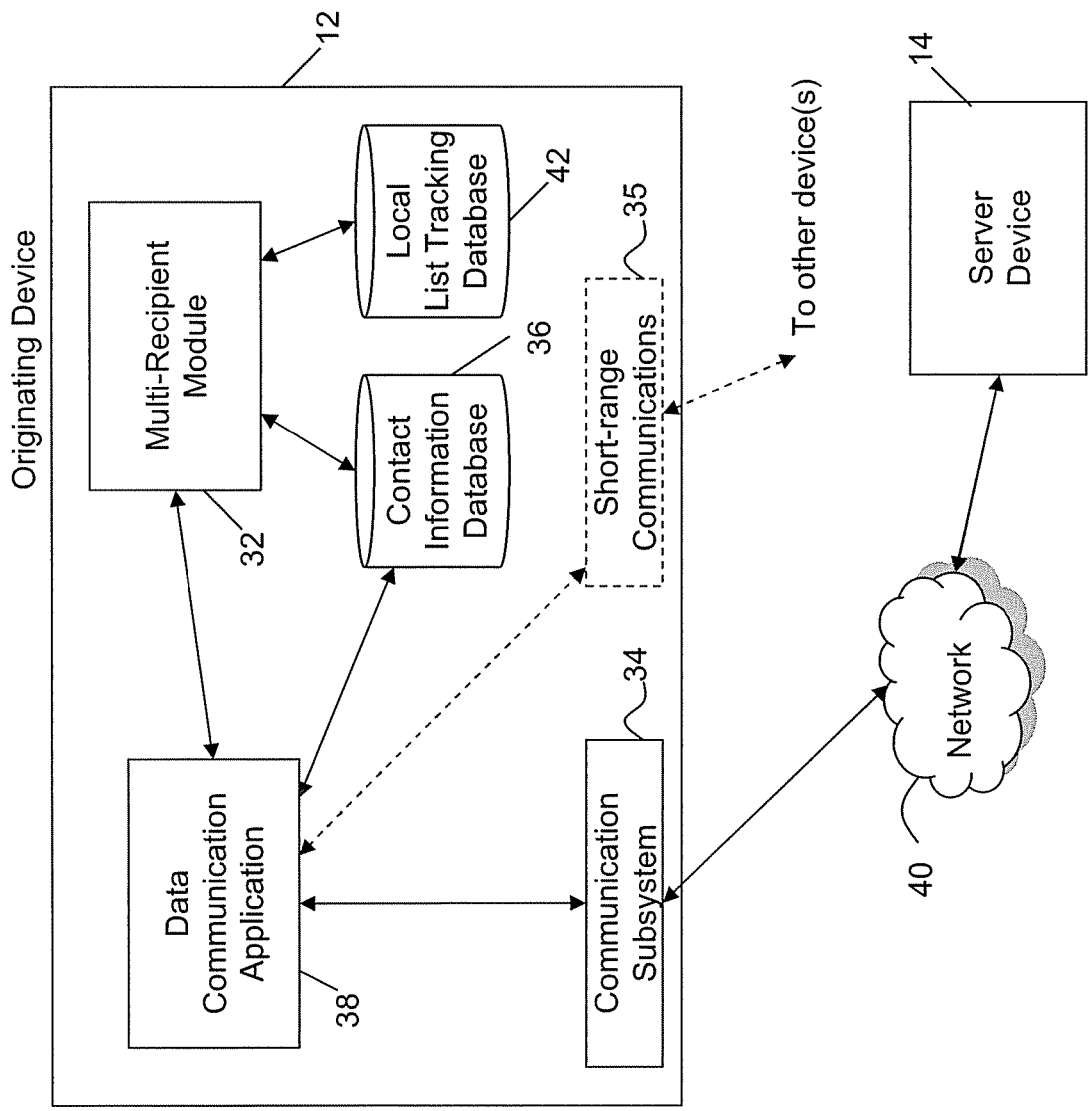
FIG. 2 is a an example block diagram showing further detail of the originating device of FIG. 1.

FIG. 2 illustrates an example configuration for components of an originating device 12 of the system 10 shown in FIG. 1. It can be appreciated that other components of the originating device 12 have been omitted in FIG. 2 for clarity. An example configuration for a mobile device 100 acting as the originating device 12 can be found in FIGS. 17 and 18 described later. In the example configuration shown in FIG. 2, a data communication application 38 is shown, which enables the originating device 12 to generate data 20 to be sent to a plurality of recipients via a communication subsystem 34. The communication subsystem 34 enables the originating device 12 to communicate with the server device 14 over a network 40. A short-range communications module 35 is also shown, which enables the originating device 12 to communicate with other devices (which may include the server device 14 although not shown in FIG. 2) via an applicable short-range communication protocol such as infrared, Bluetooth, etc. Further detail regarding an example short-range communication configuration is provided below making reference to FIG. 17. It can be appreciated that the short-range communications module 35 enables the originating device 12 to reach other devices without requiring access to the network 40. Similarly, either the communication subsystem 34 or the short-range communications module 35 or both can enable data 20 to be sent between devices via other communication protocols such as WiFi. For example, the ability to connect to WiFi can enable a direct recipient device 16 to be reachable via the network 40 but if they are connected to the same WiFi network as an indirect recipient device 18, the communication from the direct recipient device 16 to the indirect recipient device 18 does not require the network 40. The direct recipient device 16 could thus forward the data 20 to the indirect recipient device 18 via WiFi, assuming the right permissions are in place.

In this example, the data communication application 38 is an existing application, such as an email program, text messaging program, instant messaging program, etc. In order to enable both direct recipient devices 16 and indirect recipient devices 18 to be identified, a multi-recipient module 32 is provided. It can be appreciated that the multi-recipient module 32 can also be incorporated in the data communication application 38 in other embodiments. The multi-recipient module 32 enables the data communication application 38 to identify information associated with a recipient that cannot be found in a local contact information database 36 (or any other contact database accessible thereto). The multi-recipient module 32 also creates and maintains a local list tracking database 42, which can be used to keep track of which of the group of recipients identified for particular data 20 has received the data 20, e.g. via updates 30 received from the server device 14. It can be appreciated that the local list tracking database 42 can be synchronized with the global list tracking database 28 such that any lists being maintained by the server device 14 are up-to-date on the originating device 12. In other embodiments, the originating device 12 can instead rely on the updates 30 received from the server device 14 to notify the user of the status of a particular list and, therefore, the local list tracking database 42 may not be required in such embodiments.

FIG. 3 illustrates an example configuration for components of a server device 14 that can be used to participate in the system 10 shown in FIG. 1. It can be appreciated that other components of the server device 14 have been omitted in FIG. 3 for clarity. For example, it can be appreciated that the server device 14 may include one or more processors, various other databases and administrative tools and interfaces. The server device 14 in the configuration shown includes recipient list tracking module 44 for creating and managing lists to be stored and updated in the global list tracking database 28 which, in FIG. 3 is shown as being incorporated into the server device 14 itself. The recipient list tracking module 44 is configured to have access to information associated with data 20 being sent through or by the server device 14. The recipient list tracking module 44 may also be configured for intercepting the data 20 or examining data caches or queues which handle the data 20, in order to determine a group of recipients, both direct and indirect, that are to ultimately receive the data 20. The recipient list tracking module 44 is also configured to communicate over the network 40 via a communication layer 46, in order to receive ACKs 26 from direct and indirect recipient devices 16, 18, and to provide updates 30 to originating devices 12.

FIG. 4 illustrates an example configuration for components of a direct recipient device 16 that can be used to participate in the system 10 shown in FIG. 1. It can be appreciated that other components of the direct recipient device 16 have been omitted from FIG. 4 for clarity. As noted above, an example configuration for a mobile device 100, which can also act as the direct recipient device 14, can be found in FIGS. 17 and 18 described later. In the example configuration shown in FIG. 4, the direct recipient device 16 also comprises a data communication application 38 which is the same as or capable of interfacing or otherwise communicating with the data communication application 38 in the originating device 12. As noted above, any direct recipient device 16 can also be an originating device 12 in some circumstances. Therefore, as shown in FIG. 4 for ease of explanation, the direct recipient device 16 may also include a multi-recipient module 32, which can be further configured to interact with the local contact information database 36 to find addresses for indirect recipient devices 18. Alternatively, although not shown in FIG. 4, the data communication application 38 can include a module, which can comprise any set of computer executable instructions that enable a direct recipient device 16 to provide ACKs 26 in response to receipt of the data 20 and to manage the acquisition of addresses for indirect recipient devices 18. It can be appreciated that these examples are for illustrative purposes only and that any other suitable module, application, or set of instructions can be used to enable the direct recipient device 16 to participate in an exchange similar to that shown in FIG. 1. The direct recipient device 16 also comprises a communication subsystem 34 for enabling communications with the server device 14 and the indirect recipient device 18, in this example, via the network 40 for simplicity.

As also shown in FIG. 4, the direct recipient device 16 may also comprise a short-range communications module 35 to enable it to communicate with originating devices 12 and/or indirect recipient devices 18 via a short-range communication protocol such as Bluetooth. It can therefore be appreciated that the principles discussed herein can be applied to any communication configuration and do not rely on a network connection. For example, in some circumstances, an indirect recipient device 18 may be in close proximity (e.g. within Bluetooth range) of a direct recipient device 16 and, to reduce the strain on the network 40, the data 20 can be sent directly to the indirect recipient device 18 via the short-range communication protocol. It can be appreciated that, where necessary, Bluetooth pairing or other permissions may need to be obtained before the data 20 can be communicated between devices. In other circumstances, such as those wherein a network 40 is not available, the short-range communications module 35 can be used in a mesh-network type configuration to pass along the data 20 via devices having overlapping connectivity. As such, it can be appreciated that any suitable communication medium can be used to apply the principles discussed herein.

It can be appreciated that the indirect recipient device 18 may be configured in a manner similar to either the originating device 12 or the direct recipient device 16 (or any suitable variation thereof).

Figure 6:
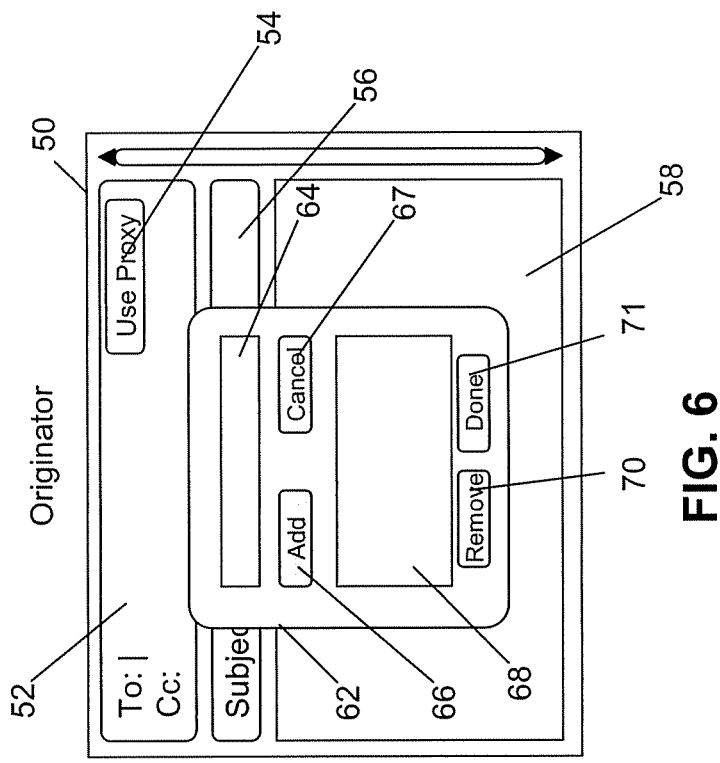
FIG. 6 is an example screen shot of an additional recipient entry tool.
Figure 5:
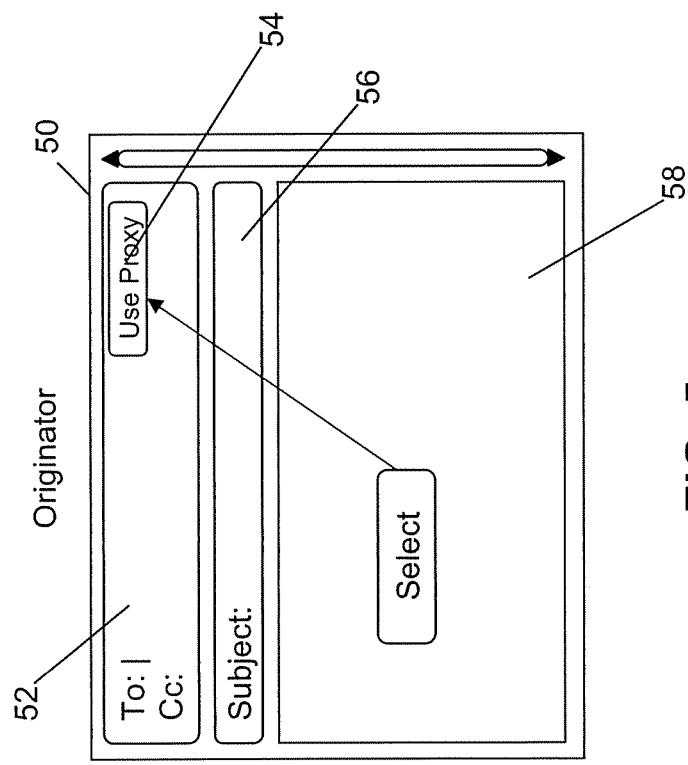
FIG. 5 is an example screen shot of a new email message being generated using the originating device.

Turning now to FIGS. 5 and 6, example screen shots are provided illustrating one way in which to incorporate both direct recipient identifiers 22 and indirect recipient identifiers 24 into data 20 to be sent by an originating device 12. In FIG. 5, an example screen shot for an email message generation interface 50 is shown. As is well known in the art, when generating a new email message, a To field 52 is typically provided to enable the user to enter corresponding email addresses for intended recipients. In this example, the To field 52 can be used to enter direct recipient identifiers 22, namely email addresses for direct recipient devices 16 in this example. As is also well known in the art, a Subject field 56 and message body field 58 are typically provided to enable the user to identify the email message's subject and insert the content of the message respectively. In order to provide indirect recipient identifiers 24, the email message generation interface 50 in the example shown is modified to include a Use Proxy button 54. It can be appreciated that the Use Proxy button 54 is only one example mechanism for enabling indirect recipient identifiers 24 to be associated with the email message being generated. For example, a menu option (not shown) or other input mechanism can be used.

In other embodiments, it may be advantageous to enable indirect recipient identifiers 24 to be added automatically, e.g. by allowing the user to simply enter characters associated with the indirect recipient into the To field 52 as they would for a direct recipient identifier 22. In this way, as the names or other identifying information are entered, if an address is known, it can be added as a direct recipient identifier 22 or, if an address is not known, the information can be added as an indirect recipient identifier 24. Such an embodiment provides a transparent ability to add indirect recipients to the list of recipients thereby avoiding the need to have the user determine which recipients are known to them and which are not.

However, for the purpose of illustrating the principles herein, the example shown in FIGS. 5 and 6 utilize the Use Proxy button 54.

By selecting the Use Proxy button 54, an indirect recipient entry box 62 may be initiated and displayed as shown in FIG. 6. In this example, the entry box 62 is provided as an example mechanism to enable the user to provide at least one identifier associated with each of one or more indirect recipient devices 18. In this way, the user can enter those addresses that it knows of or has access to using the To field 52 and then select the Use Proxy button 54 to complete the list of recipients to include those for which it cannot provide an address.

It may be noted that the user of the originating device 12 may have old or otherwise obsolete addresses and thus some recipients may begin as a direct recipient device 16 but upon determining that the recipient cannot be reached at the specified address, they would then become an indirect recipient device 18. Such a determination can be made in any suitable manner. For example, the server device 14 can be configured to determine undeliverable addresses and automatically update the information included in data 20 being sent to the direct recipient devices 14, or the originating device 12 can be configured to update the list(s) in the databases 28, 42, in accordance with the receipt of an "undeliverable" message if such a message is received. Alternatively, the originating device 12 can be configured to obtain a notification that an address is undeliverable (e.g. via the network 40 or server device 14) and provide this information to the server device 14 (if the server device 14 does not already know this information) to enable the server device 14 to update the global list in the database 28, and provide a further transmission of the data 20 to the direct recipient devices 16 in an attempt to find a valid address for the obsolete address The entry box 62 provides an identifier entry field 64 for enabling the user to enter one or more characters associated with a desired identifier (e.g. a name), an Add button 66 to enable the contents of the entry field 64 to be added as a new entry in a list preview field 68, and a Cancel button 67 to abort the process. Also shown in FIG. 6 is a Remove button 70 which can be used to enable the user to select a particular entry in the list preview field 68 and delete this entry (e.g. if a mistake is made). Such list creation and entry removal mechanisms are well known in the art. Once the desired list of indirect recipients is complete, a Done button 71 can be selected.

Once the Done button 71 has been selected, the new message being created is updated to include one or more indirect address identifiers 24. In this example, the email message thus created represents the data 20 that is sent to one or more direct recipient devices 16 via the server device 14. An example screen shot of a received email message 50' is shown in FIG. 7. In FIG. 7, the received email message 50' comprising the message 58' created by the originating device 12 is shown on a display at the direct recipient device 16, for this example, a device that is associated with User A. The message 50' being displayed is similar to a typical email message, however, in this example is configured to include at least an indication of the indirect address identifier(s) 24, to notify to User A that one or more other recipients need to be reached but their current and valid addresses are unknown or unavailable. In this example, for ease of explanation, User A is the only direct recipient device 16 and User B is the only indirect recipient device 18 as shown in an indirect identifier list 74. It can be appreciated that the indirect identifier list 74 is shown for illustrative purposes only and, in other embodiments may not be shown. For example, the direct recipient device 16 may be configured to operate in a manner that is hidden or transparent to the associated user such that the multi-recipient module 32 forwards data 20 to one or more indirect recipient devices 18 without explicit instructions from User A. In other words, the user does not need to know who has not been reached yet, but may be provided with information that is indicative of the fact that one or more intended recipients have not been reached.

In order to obtain permission to have User A's direct recipient device 16 act as a proxy, a permission prompt 78 can be displayed as shown in FIG. 8. The permission prompt 78 can be displayed immediately upon opening the new message 50', or at any other suitable time (e.g. after acknowledging receipt). It can be appreciated that the permission prompt 78 is shown only to illustrate the principles and may instead be done automatically according to user preferences, a prescribed IT policy, or any other criteria. In this example, the permission prompt 78 asks the user whether or not the multi-recipient module 32 can search the user's contact information database 36 (or other repository if such a repository exists) to find addresses for a list of one or more indirect recipients, i.e. asks for permission to have the direct recipient device 16 act as a proxy for the originating device 12. The permission prompt 78 in FIG. 8 provides a Yes button 80 to enable permission to be provided, and a No button 82 to enable permission to be refused. An Always allow option 84 and a Never allow option 85 are also provided in this example to enable User A to avoid receiving the same prompt 78 in further communications. By selecting the Always allow option 84 or Never allow option 85, a set of user preferences or a profile (not shown) may be created and/or updated. Such preferences or profiles can be maintained by the multi-recipient module 32 (if it exists), or any other suitable component (e.g. the contact information database 36).

A user profile or set of user preferences may be available and may be configurable by the user to enable the direct or indirect recipient device 16, 18 to automatically handle at least some of the permissions. For example, such a profile or set of preferences can include permissions such as to always allow permission when the sender (originator or direct recipient) is in their contact information database 36, or forms part of a pre-approved group (e.g. family, co-workers, etc.). The user may be provided with a separate interface (not shown) in order to add, edit or delete permissions or the permissions may be configurable by a third party entity or third party application.

Assuming that User A actuates the Yes button 80, the proxy module 48 or multi-recipient module 32 can begin examining contact information in the direct recipient device 16, e.g. in the contact list database 36 to determine if it can act as a proxy by sending the data 20 to one or more indirect recipient devices 18, and for how many of the specified indirect recipient devices 18.

Turning back to FIG. 7, it can be seen that, in this example, the displayed representation of message 50' also includes an Acknowledge button 72 to enable User A to acknowledge receipt of the message 50' and in turn have the direct recipient device 16 return an ACK 26 to the server device 14. It can be appreciated that the acknowledgement mechanism shown in this example is a manual process only for illustrative purposes and, in other embodiments, the ACK 26 can be generated automatically in a manner that is hidden or transparent to User A. Upon an actuation of the Acknowledge button 72, an ACK 26 is generated at the direct recipient device 16 and sent to the server device 14. This enables the server device 14 to update the global list tracking database 28 and send an update 30 to the originating device 12.

Figure 10:
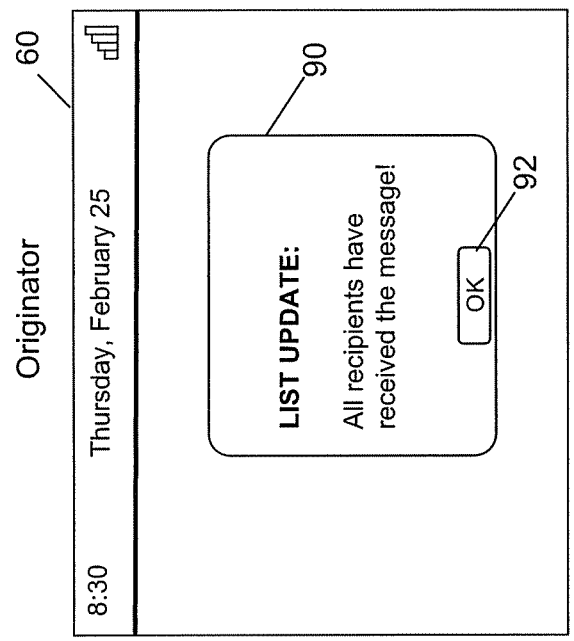
FIG. 10 is an example screen shot of another list update provided by the server device.
Figure 9:
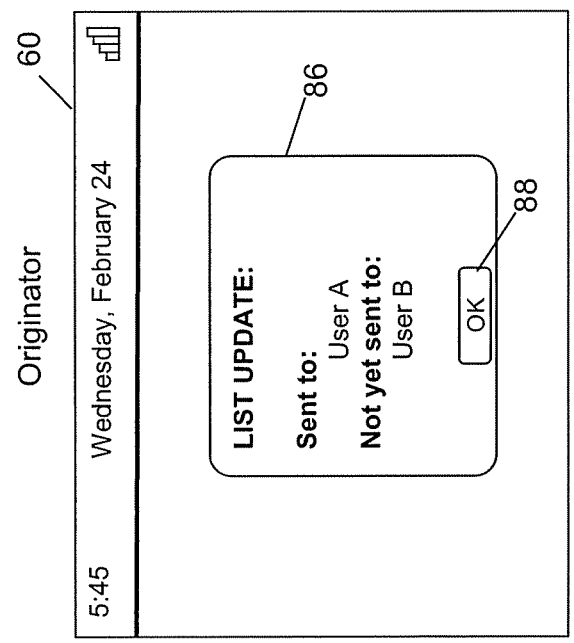
FIG. 9 is an example screen shot of a list update provided by the server device.

FIG. 9 illustrates an example update prompt 86 displayed in a user interface screen 60 for the originating device 12. In this example, the update prompt 86 simply provides a message to the Originator indicating which of the recipients have received the data 20 and which are still yet to receive the data 20. In this case, User A has acknowledged receipt of the data 20 but an acknowledgement has not yet been received for User B. An Ok button 88 can be selected in order to close the prompt 86. Another update prompt 90 is shown in FIG. 10, which includes a further update regarding the list of recipients. In this case, the server device 14 has received an ACK 26 from the indirect recipient device 18 associated with User B and thus all recipients have received the data 20. An Ok button 92 can be selected to close the prompt 90.

Figure 11:
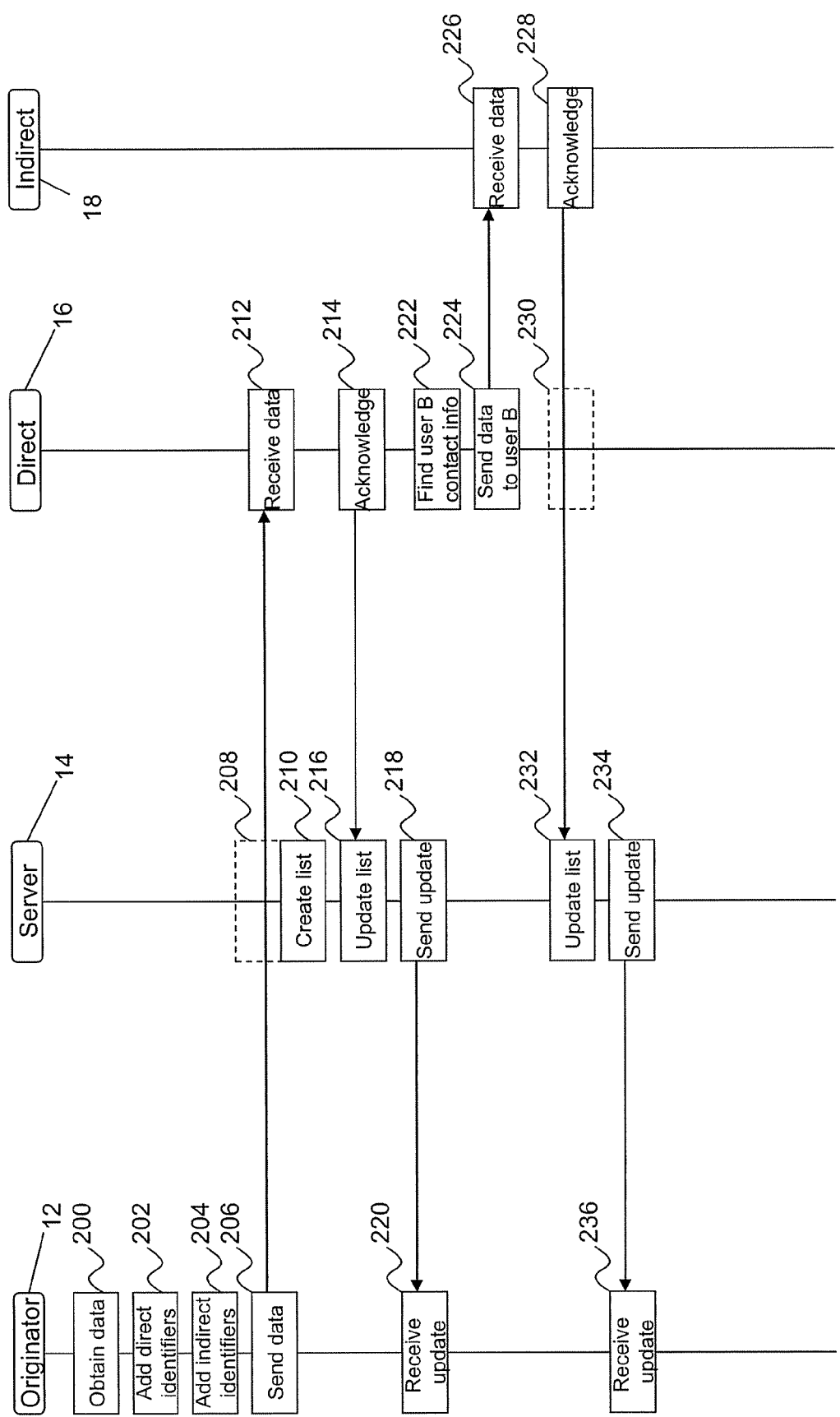
FIG. 11 is an example sequence diagram showing an example process for using a direct recipient device to send data to an indirect recipient device and tracking a list at a server device.

The example illustrated by way of screen shots in FIGS. 5 to 10 is shown in an exemplary sequence diagram in FIG. 11. The sequence begins at 200, wherein the originating device 12 obtains the data 20 that is to be sent, e.g. by providing an interface to create a message, etc. The originating device 12 then enables one or more direct recipient identifiers 22 to be added at 202, and one or more indirect recipient identifiers 24 to be added at 204. The data 20 is then sent at 206, and is received by the server device 14 at 208 or otherwise made available to the server device 14 to enable a list to be created at 210. The operation 208 is shown in dashed lines to indicate that although the server device 14 may process the data 20 in the system 10, the data 20 may be exchanged through the server device 14 to arrive at the direct recipient device 16 at 212. In this example, the direct recipient device 16 acknowledges receipt of the data 20 at 214, e.g. automatically or using the Acknowledge button 72 shown in FIG. 7. An ACK 26 may then be sent to the server device 14 to enable the server device 14 to update the global list tracking database 28 at 216, and to prepare and send an update 30 to the originating device 12 at 218. The originating device 12 may then receive the update 30 at 220 and update its own local list tracking database 42.

Either following the acknowledgement at 214 (as shown) or in parallel, the direct recipient device 16 may then begin searching for contact information, i.e. an address for User B at 222. This can be done automatically or by displaying a permission prompt 78 as shown in FIG. 8. Assuming that User A provides permission, and contact information for User B and its indirect recipient device 18 can be found in the contact information database 36, the data 20 may then be sent to the indirect recipient device 18 and User B at 224. The data 20 is then received by the indirect recipient device 18 at 226, and receipt acknowledged with an ACK 26 at 228. As shown by way of dashed lines at 230, the ACK 26 sent by the indirect recipient device 18 may be sent to the direct recipient device 16 or directly to the server device 14. In either case, the ACK 26 is received by the server device 14, which can then update the global list tracking database 28 at 232, prepare and send a new update to the originating device 12 at 234, which may then be received at 236. It can therefore be appreciated from FIG. 11 that by providing indirect recipient identifiers 24 in association with the data 20, the originating device 12 can rely on an direct recipient device 16 as a proxy to reach indirect recipient devices 18.

Figure 12:
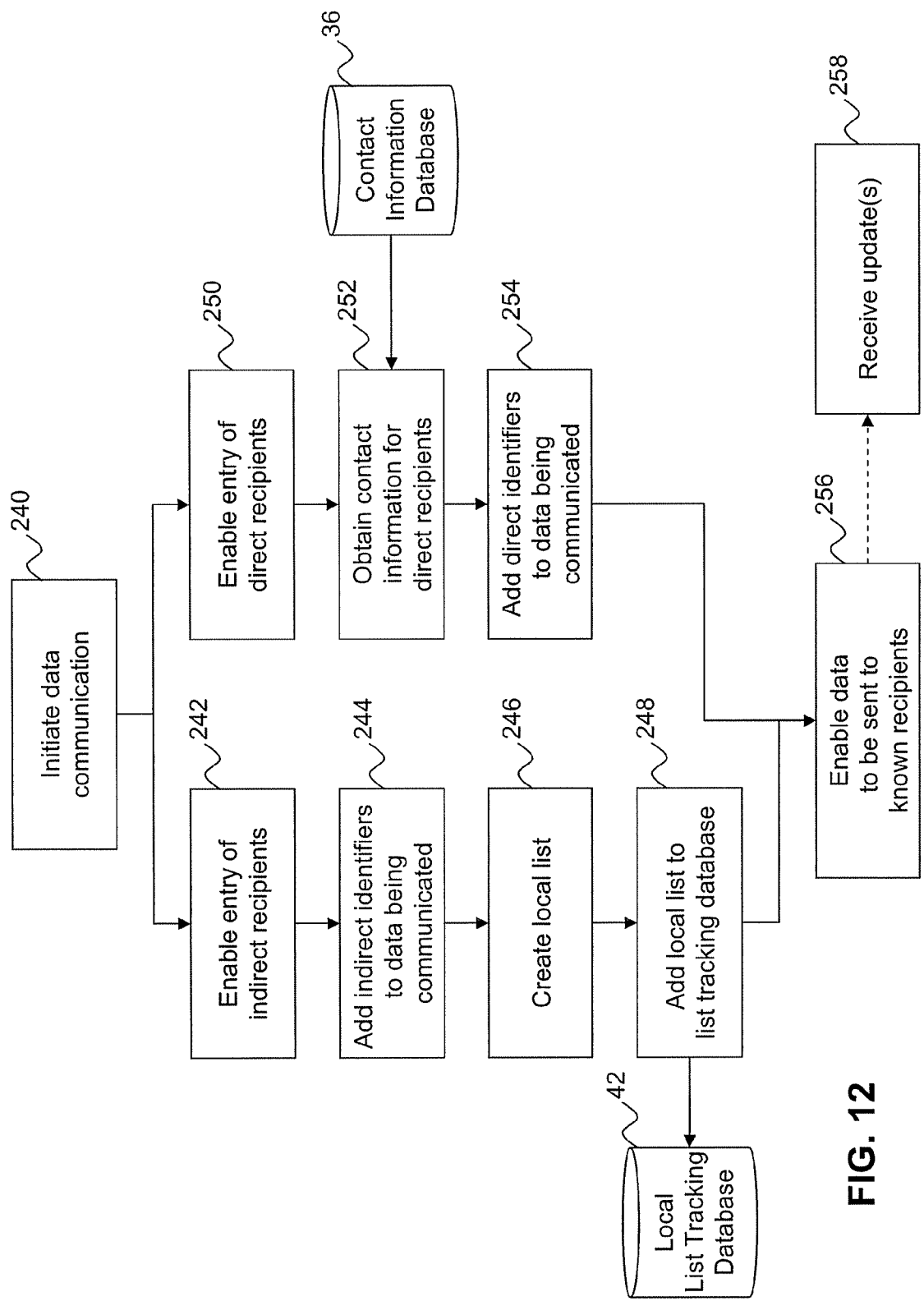
FIG. 12 is an example set of computer executable instructions performed by the originating device in preparing a data communication having both direct and indirect recipients.

Turning now to FIG. 12, an example set of computer executable instructions is shown that may be implemented by an originating device 12 for initiating communication of data 20 to be sent to both direct and indirect recipient devices 16, 18. At 240, the originating device 12 enables, e.g. via the data communication application 38, the initiation of communication of data 20. For example, a new email message may be generated as shown in FIG. 5. At 242, the multi-recipient module 32 enables the entry of one or more indirect recipients associated with corresponding indirect recipient devices 18. For example, the entry box 62 can be provided on the originating device 12 in order to enable the entry of indirect recipient identifiers 24 or the indirect recipient identifiers 24 can be entered directly into the To field 52 if the application permits as discussed above. The multi-recipient module 32 then coordinates with the data communication application 38 at 244 (if necessary) to add the indirect recipient identifiers 24 to the data 20 being communicated. In this example, since the originating device 12 is attempting to reach one or more indirect recipients, a local list is created at 246 and added to the local list tracking database 42 at 248. At the same time, before, or after, the data communication application 38 or multi-recipient module 32 enables entry of one or more direct recipient addresses at 250. For example, as shown in FIG. 5, the To field 52 can be used to type in known email addresses or to add contacts from the contact information database 36. The contact information, e.g. addresses, for the direct recipient devices 16 are then obtained at 252, in this example from the contact information database 36, and the associated direct recipient identifiers 22 added to the data 20 at 254. With the data 20 now including both direct and indirect recipient identifiers 22, 24, the data communication application 38 enables the data 20 to be sent to the known or direct recipients at 256, e.g. via the communication subsystem 34 and network 40. Some time after sending the data 20, the originating device 12 may receive from the server device 14, one or more updates at 258.

Figure 13:
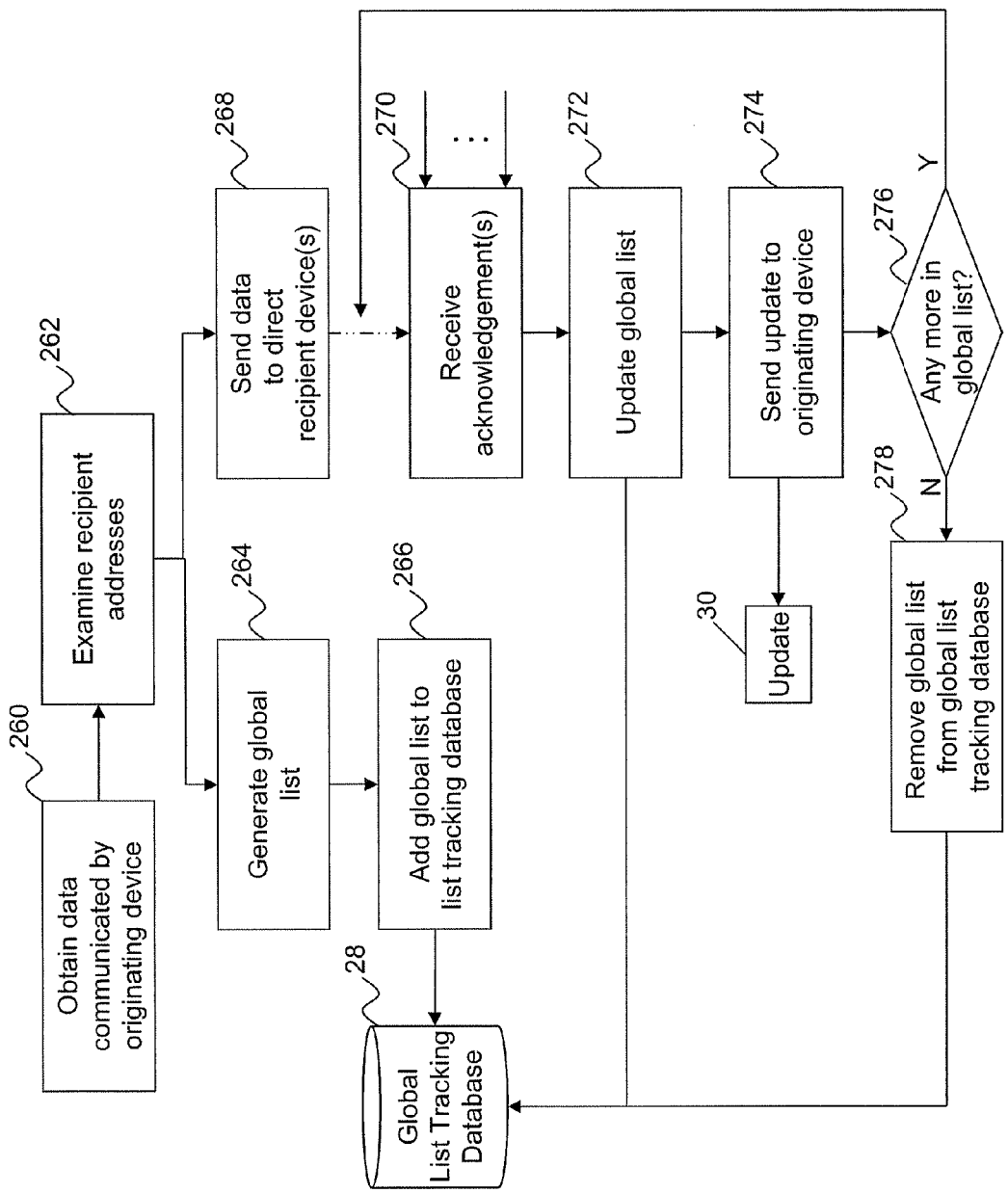
FIG. 13 is an example set of computer executable instructions performed by the server device in forwarding a data communication to a direct recipient and maintaining a list of recipients for notifying the originating device.

FIG. 13 illustrates an example set of computer executable instructions that may be implemented on a server device 14 for maintaining the global list tracking database 28, forwarding data 20 to direct recipient devices 16, and providing updates to an originating device 12. At 260, data 20 communicated by the originating device 12 is obtained and the recipient addresses are examined at 262, e.g. by examining the direct and indirect recipient identifiers 22, 24. In this example, the server device 14 is configured for maintaining global lists pertaining to communications from an originating device 12 involving both direct and indirect recipient identifiers 22, 24, and thus a global list is generated by the recipient list tracking module 44 at 264, and the global list added to the global list tracking database 28 at 266. At the same time, before, or after, the server device 14 sends the data 20 to the one or more direct recipient devices 16 at 268, e.g. according to the addresses included in the direct recipient identifiers 22. The server device 14 at some later point in time receives one or more ACKs 26 at 270 from one or more of the direct recipient devices 16 and one or more of the indirect recipient devices 18 (either directly or via a direct recipient device 16), for determining that the data 20 has reached particular recipients. The global list that was added to the global list tracking database 28 at 266 is updated at 272 to reflect the successful delivery of the data 20 according to the ACKs 26 received. The server device 14 may then send an update 30 to the originating device 12 at 274 to enable the originating device 12 to update their local list tracking database 42 accordingly. The recipient list tracking module 44 may then determine at 276 whether or not there are any recipients remaining in the global list (e.g. if one or more indirect recipients have not received the data 20). If not, i.e. if all recipients have received the data 20, the recipient list tracking module 44 may terminate management of or otherwise remove the corresponding global list at 278. If one or more indirect recipients (or bounced-back direct recipients) still exist on the list, i.e. have not yet received the data 20, the server device 14 can be configured to accept additional ACKs 26 until the list is completed. It can be appreciated that maintenance of the list can be performed in any desired manner. For example, identifiers can be removed from the list as ACKs 26 are received, or a flag or other mechanism can be used to "check off" identifiers as the ACKs 26 are received.

FIG. 14 illustrates an example set of computer executable instructions that may be implemented for acknowledging receipt of data 20, obtaining permission to find one or more indirect recipient addresses, and acting as a proxy to send the data 20 to one or more indirect recipients devices 18. It can be appreciated that operations similar to those shown in FIG. 14 may be performed by both the direct recipient device 16 and the indirect recipient device 18. At 280, the data 20 communicated by the server device 14 (or a direct recipient device 16) is received by the direct or indirect recipient device 16, 18. An ACK 26 may then be generated at 282 by the multi-recipient module 32, either automatically or via user input (e.g. by detecting selection of the Acknowledgement button 72). The multi-recipient module 32 may then provide a prompt at 284, e.g. the permission prompt 78 of FIG. 8, to obtain permission from the user associated with the direct or indirect recipient device 16, 18 to enable the direct or indirect recipient device 16, 18 to act as a proxy for the originating device 12 to reach one or more indirect recipients. The multi-recipient module 32 then determines at 286 whether or not permission has been granted. If not, the process ends at 288. If so, the multi-recipient module 32 accesses the contact information database 36 at 290 to determine if addresses associated with one or more of the indirect recipients indicated in the indirect recipient identifiers 24 can be found. Assuming that one or more addresses can be found at 290, the data 20 is then forwarded to the corresponding indirect recipient devices 18 at 292 and the process ends at 288. As shown in dashed lines, if so configured, the direct or indirect recipient device 16, 18 may also receive ACKs 26 from the indirect recipient devices 18 at 294 to enable it to return ACKs 26 to the server device 14 at 296.

Turning now to FIG. 15A, another example is shown, wherein an email is distributed to a list of seven recipients using the system 10. In this example, it can be seen that the initial list 300 provided by User A associated with an originating device 12 includes direct recipient identifiers 22 for three of the recipients, namely current email addresses for User B, User C. and User D. The initial list 300 also includes indirect recipient identifiers 24 for the other four recipients, namely User E, User F, User G, and User H. In this example, the address for User E is either known to be out of date or obsolete or this will eventually become known (e.g. via an undeliverable message, through a look-up performed by the server device 14, etc.). For the remaining recipients, no address information is known but the recipients are identified, e.g. by name. The right-hand portion of FIG. 15A illustrates the evolution of the initial list 300 into an empty list 306 as the server device 14 obtains ACKs 26 from the various recipients.

Since the addresses for Users B, C, and D are known, the list can be shortened by the server device 14, to include only Users E, F, G, and H at 302, in particular if Users B, C, and D each provide an ACK 26 to the server device 14. In this example, it can be seen that User B has access to addresses for Users E and F and thus can act as a proxy for User A at 302a to deliver the data 20 to those indirect recipients. Similarly, User C has access to an address for User G and thus can act as a proxy for User A at 302b to deliver the data to User G. As can be seen, the list can then be shortened such that Users E, F, and G are removed at 304. In this example, none of Users B, C, and D has access to an address for User H. However, by keeping the indirect recipient identifier 24 pertaining to User H in the data 20 sent from Users B and C, as shown in FIG. 15A, User G can also be used as a proxy for User A, even though it is twice removed from User A. Therefore, it can be appreciated that the principles discussed herein can be applied to enable propagation through a plurality of tiers by including indirect recipient identifiers 24 in subsequent communications.

However, to minimize or avoid duplicate data 20 being transmitted by more than one direct recipient (e.g. if both User B and User C had access to an address for User E), the server device 14 can be used to determine what direct recipients should be used to send data 20 to which indirect recipients. Duplicate transmissions coming from two different sources can occur, for example, when an indirect recipient device 18 is being sent the same data 20 from two (or more) direct recipient devices 16 because the ACK 26 of the first data 20 received has not yet reached the server device 14 and therefore the corresponding global list is not up-to-date when the second direct recipient device 16 sends the second copy of the data 20. To address this, in one example when acknowledging receipt of the data 20, each direct recipient device 16 includes the details of which indirect recipients it can reach. In such embodiments, the acknowledgement process is completed after the permission process. A reply is sent by the server device 14 to the direct recipient device 16 indicating which of the indirect recipient devices 18 have not yet received the data 20. Therefore, the process shown in FIG. 14 can be modified to include an additional exchange between the server device 14 and the direct recipient device 16 as shown in FIG. 15B.

Figure 15B:
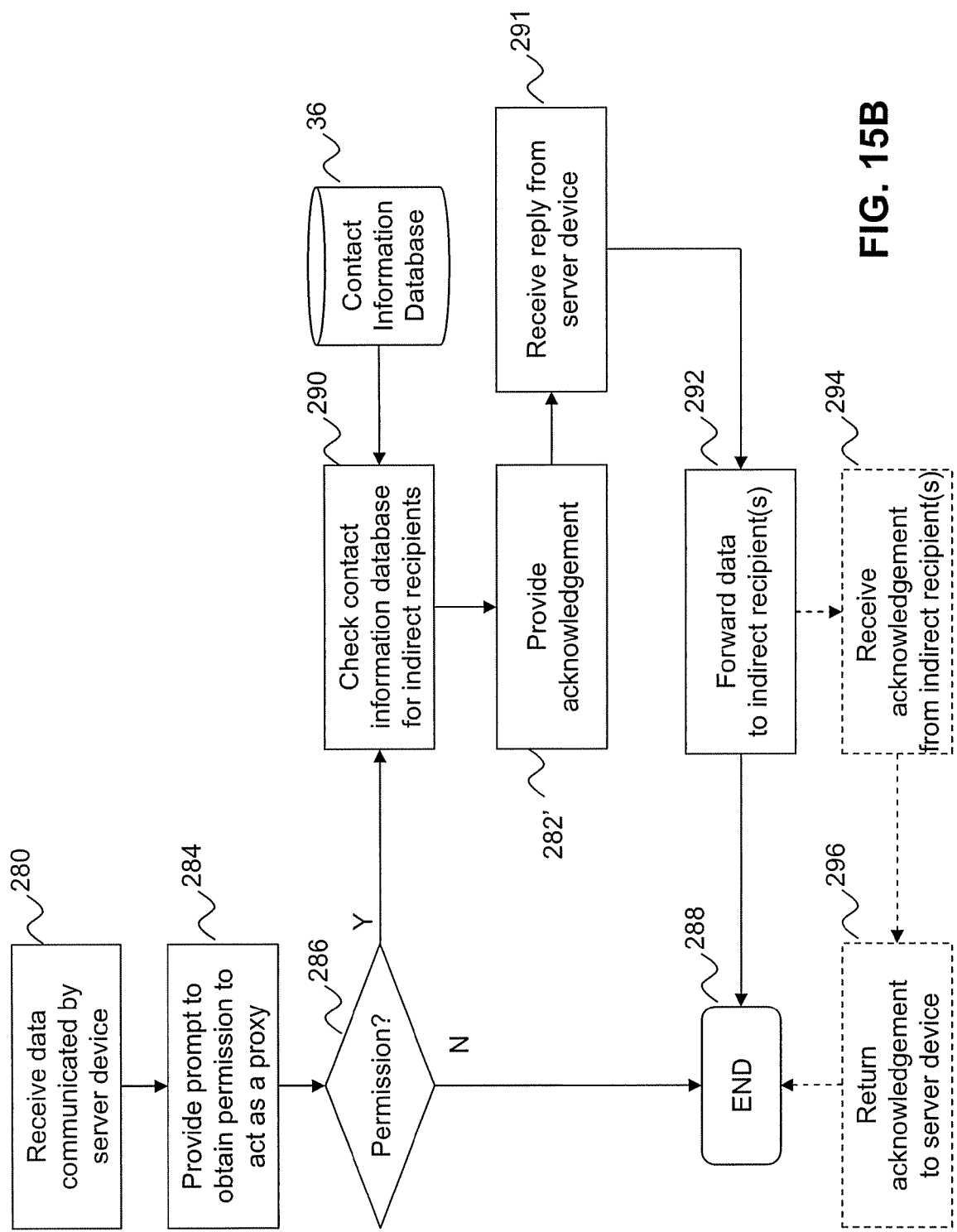
FIG. 15B is another example set of computer executable instructions performed in forwarding a data communication to an indirect recipient and acknowledging receipt of the data communication for updating the originating device.

As shown in FIG. 15B, the provide acknowledgement operation 282 can be performed once the permission determination at 286 and the receipt of an approval from the server device 14 at 291 are obtained. It can be appreciated that although not shown in the figures, the server device 14 is configured in this embodiment to reply to the acknowledgements received from the direct recipient devices 16, wherein the reply includes an indication of which of the provided indirect recipients have already (or are in the process of) been contacted. In this way, the direct recipient device 16 can avoid sending the data 20 to a particular indirect recipient device 18 if another device has already done so.

Figure 15C:
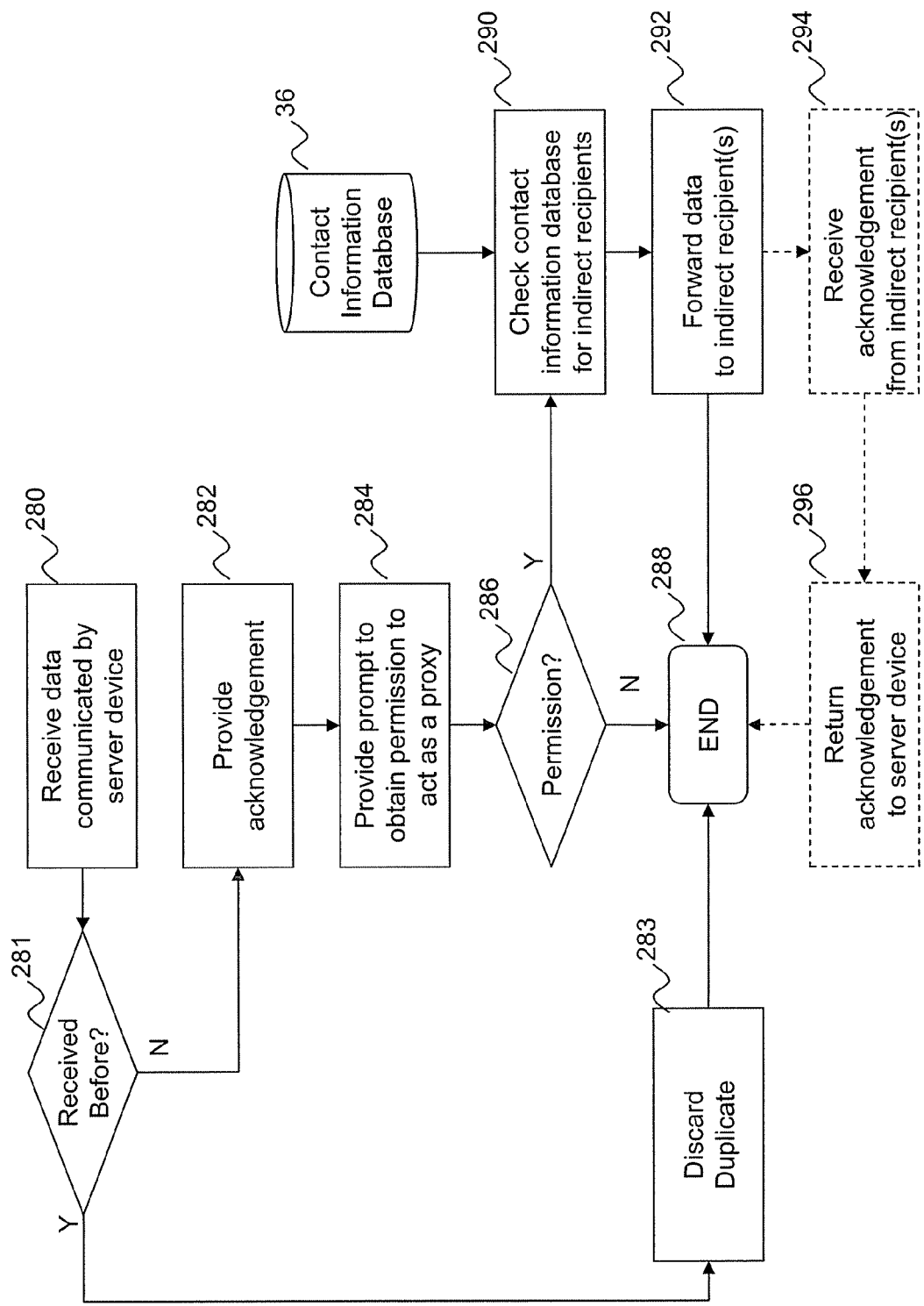
FIG. 15C is another example set of computer executable instructions performed in forwarding a data communication to an indirect recipient and acknowledging receipt of the data communication for updating the originating device.

In another example, shown in FIG. 15C, the direct or indirect recipient device 16, 18 receiving the data 20 is configured to first determine whether or not they have already received the data 20 at 281, i.e. determine if the incoming data 20 is a duplicate transmission. If no, the process shown in FIG. 14 can continue as described in relation to FIG. 14. If the data 20 is a duplicate transmission, the process shown in FIG. 15C may end at 288 so as to avoid duplicate display, acknowledgement, and permission seeking operations. For example, when determining that data 20 received is a duplicate transmission, the direct and/or indirect recipient devices 16, 18 discard(s) the data 20 at 283 and avoid displaying it in any associated user interface such as an email inbox (not shown). It can therefore be appreciated that various mechanisms of varying levels of sophistication and bandwidth intensity can be incorporated into the system 10 in order to manage the delivery of the data 20 to indirect recipient devices 18. For example, in some configurations, the data 20 may be pushed by an intermediary such as a relay or router type server (not shown) to the direct and/or indirect recipient devices 16, 18 and, in such cases, the intermediary instead checks for duplicates to reduce the bandwidth required.

Figure 16:
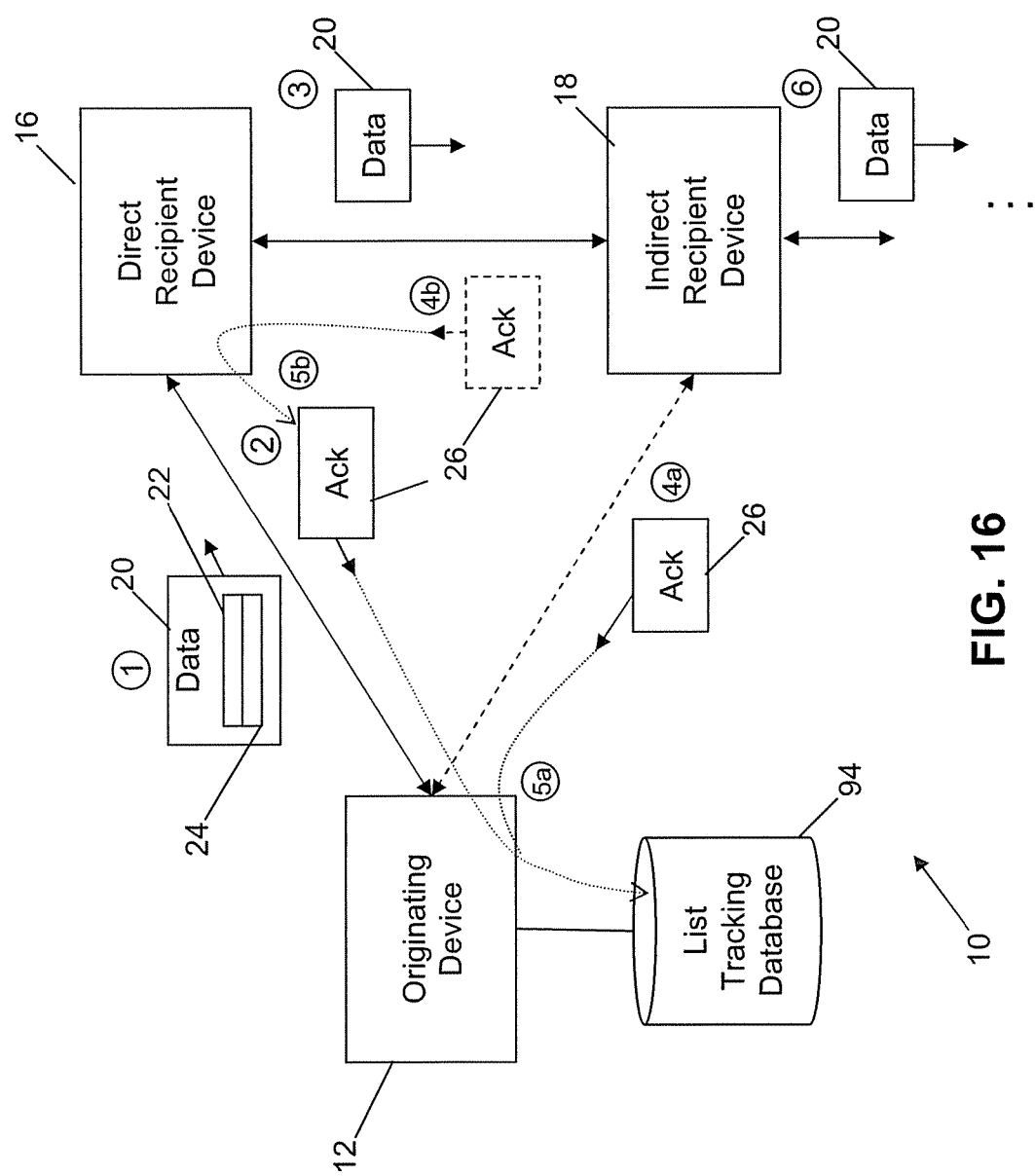
FIG. 16 is an example schematic diagram of a data communication system for sending data to an indirect recipient through a direct recipient without using a server device to track list updates.

Turning now to FIG. 16, another example embodiment is shown wherein the system 10 is implemented without a server device 14. In such a configuration, it can be appreciated that the multi-recipient module 32 or another module (not shown) could be programmed to perform the operations performed by the server device 14 in the above examples. It can be seen that a generic list tracking database 94 can be utilized by an originating device 12 that initiates the distribution of data 20, thus replacing local and global lists. Also, in such configurations, each originating device 12 would maintain its own lists. At stage 1, the data 20 is sent to the direct recipient device 16, which sends an ACK 26 at stage 2 to enable the originating device 12 to update its list tracking database 94. At stage 3, the data 20 is then sent by the direct recipient device 16 to an indirect recipient device 18, and an ACK 26 is sent either directly at stage 4*a* or indirectly at 4*b* as above. In either case, the originating device 12 receives the ACK 26 from the indirect recipient device 18 to enable the list to be updated until complete. It may be noted that although the indirect recipient device 18 cannot at first be communicated with directly by the originating device 12, in cases such as email communications, the indirect recipient device 18 can obtain the address associated with the originating device 12 in order to enable the ACK 26 to be sent directly. Of course, as shown, if there is no direct communication link between the originating device 12 and the indirect recipient device 18, the direct recipient device 16 can be used as a proxy for both the data 20 and the ACK 26. It can be seen that the configuration shown in FIG. 16 eliminates the need for updates 30 since the ACKs 26 can provide this function.

A server device 14 can be used to ensure that the originating device 12 does not obtain address information for the indirect recipient device 18 without the proper permission. Rather than requiring a server device 14, a permission prompt (not shown) is displayed at the indirect recipient device 18 to obtain permission for the originating device 12. In yet another configuration, the originating device 12 could receive only minimal information via the ACK 26, for example a confirmation with no information regarding the address associated with the indirect recipient device 18. Another way to achieve this is to have all ACKs 26 go back through only direct recipient devices 16 whose addresses are already known to the originating device 12.

Although the principles discussed above are applicable to any computing device (as shown in FIG. 1), the example embodiments described above are particularly suitable for use in a mobile wireless communication device, also referred to herein as a mobile device 100, for illustrative purposes only. Examples of applicable communication devices include pagers, cellular phones, cellular smart-phones, wireless organizers, personal digital assistants, computers, laptops, hand-held wireless communication devices, wirelessly enabled notebook computers and the like.

The mobile device 100 can be a multi-way communication device with advanced data communication capabilities including the capability to communicate with other mobile devices 100 or computer systems through a network of transceiver stations. The mobile device 100 may also have the capability to allow voice communication. Depending on the functionality provided by the mobile device 100, it may be referred to as a data messaging device, a multi-way pager, a cellular telephone with data messaging capabilities, a wireless Internet appliance, or a data communication device (with or without telephony capabilities).

Figure 17:
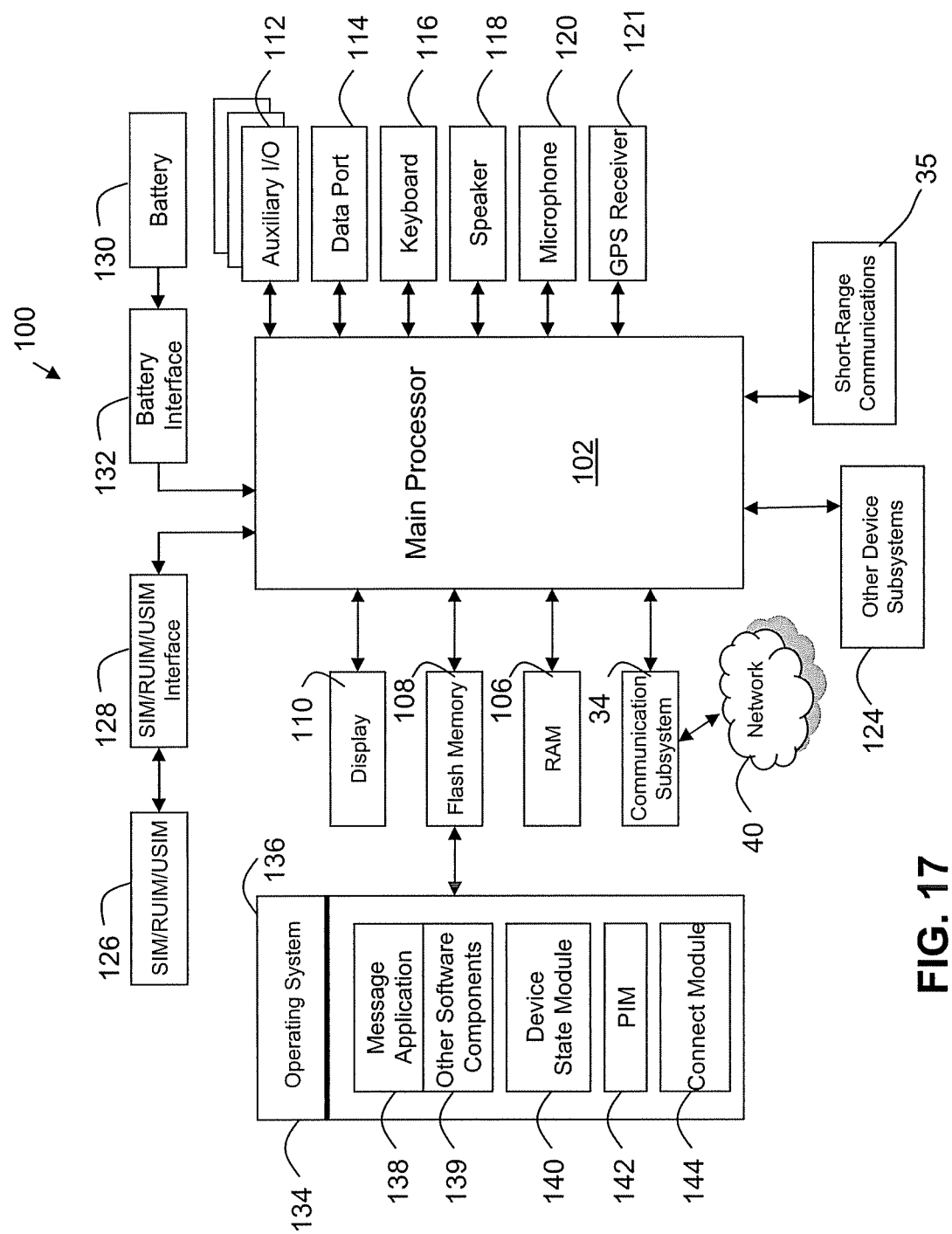
FIG. 17 is a block diagram of an example embodiment of a mobile device.
Figure 18:
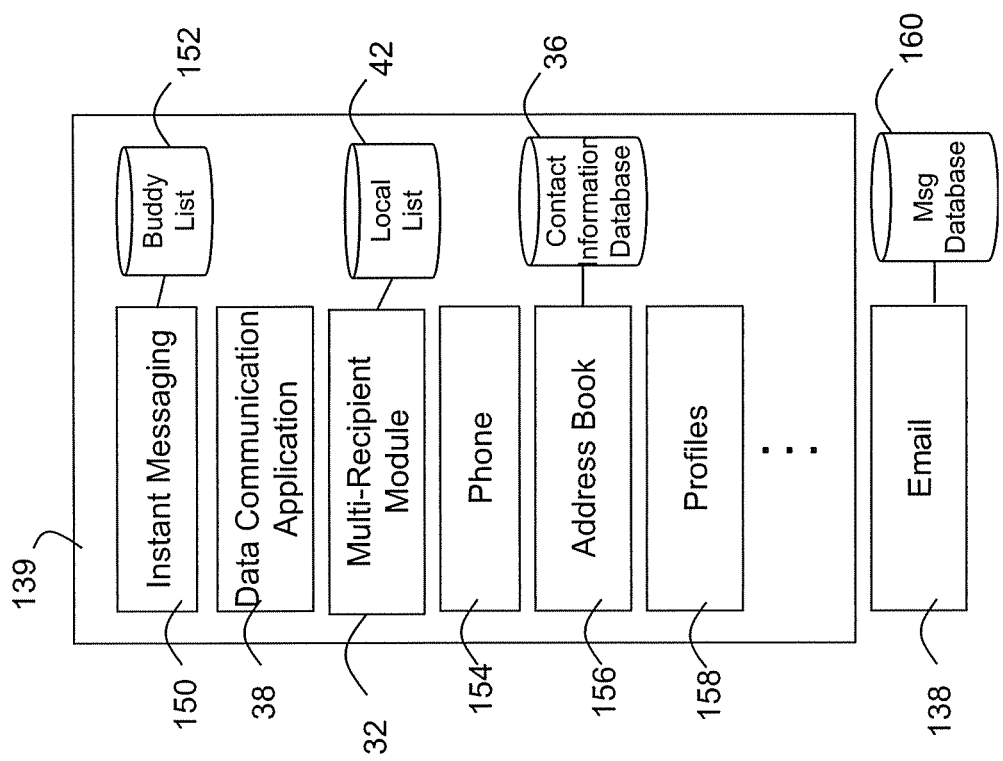
FIG. 18 is a block diagram illustrating example ones of the other software components shown in FIG. 17.

An example configuration for a mobile device 100 is illustrated in FIGS. 17-18. Referring first to FIG. 17, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 34 (e.g. a shown in FIG. 2). The communication subsystem 34 receives messages from and sends messages to a wireless network 40 (e.g. as also shown in FIG. 2). In this example embodiment of the mobile device 100, the communication subsystem 34 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE), Universal Mobile Telecommunications Service (UMTS), and Long Term Evolution (LTE). New standards are still being defined, but it is believed that they will have similarities to the network behavior described herein, and it will also be understood by persons skilled in the art that the example embodiments described herein are intended to use any other suitable standards that are developed in the future. The wireless link connecting the communication subsystem 34 with the wireless network 40 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 40 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE, LTE, and UMTS. Some other examples of data-centric networks include WiFi 802.11, WiMax, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 35 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 40, and device-resident functions such as a calculator or task list.

The mobile device 100 can send and receive communication signals over the wireless network 40 after required network registration or activation procedures have been completed. Network access is associated with a subscriber or user of the mobile device 100. To identify a subscriber, the mobile device 100 may require a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 may not be fully operational for communication with the wireless network 40. By inserting the SIM card/RUIM 126 into the SIM/RUIM interface 128, a subscriber can access subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 may be a battery-powered device and, in such cases would include a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100. It can be appreciated that the mobile device 100 also be a "plugged in" device and thus may not require a battery 130 or battery interface 132 in such configurations.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. In addition to the message application 138, the software applications 136 may also comprise various other software components 139, some of which will be describe in greater detail below. Various alternatives exist for the message application 138 as is well known to those skilled in the art. Messages that have been sent or received by the user are typically stored in the flash memory 108 of the mobile device 100 or some other suitable storage element in the mobile device 100. In at least some example embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 40. PIM data items may be seamlessly integrated, synchronized, and updated via the wireless network 40 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 5 and 6, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 40, the auxiliary I/O subsystem 112, the data port 114, the short-range communications subsystem 35, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 35 provides for communication between the mobile device 100 and different systems or devices, without the use of the wireless network 40. For example, the subsystem 35 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 34 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 40 through the communication subsystem 34.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

FIG. 18 shows an example of the other software applications and components 139 that may be stored on and used with the mobile device 100. Only examples are shown in FIG. 18 and such examples are not to be considered exhaustive. In this example, an instant messaging application 150, a data communication application 38, a multi-recipient module 32, phone application 154, address book 156 and a profiles application 158 are shown to illustrate the various features that may be provided by the mobile device 100. It may be noted that the multi-recipient module 32 is shown as a separate component (i.e. from the data communication application 38 or other data communication related application) for illustrative purposes only and may instead be part of or otherwise a subset of the data communication application 38. Also shown in FIG. 18 is the message application 138, which in the following will be referred to as an email application 138 for clarity and stores or otherwise has access to a message database 160 for storing incoming and outgoing messages as well as those stored in various folders. It will be appreciated that the email application 138 may also be considered a "data communication application" that includes or utilizes a multi-recipient module 32 and is shown separately to illustrate that various data communication related applications can apply the principles discussed herein. It will also be appreciated that the various applications may operate independently or may utilize features of other applications. For example, the phone application 154, data communication application 38, and email application 138 may use the address book 156 for contact details obtained from a contact information database 36. The contact information database 36 is shown as being accessible through the address book 156 as an illustrative example only and it can be appreciated that, as shown in FIG. 2, the data communication application 38 or email application 138 or multi-recipient module 32 may also have access to the contact information database 36 either directly or through another application such as the address book 156.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100 (or devices 12, 14, 16, 18) or accessible or connectable thereto. Any application or module herein described may be implemented using computer readable/executable instructions that may be stored or otherwise held by such computer readable media.

Although the above principles have been described with reference to certain specific embodiments, various modifications thereof will be apparent to those skilled in the art without departing from the scope of the claims appended hereto.

The invention claimed is:

1. A method of providing data, the method comprising an originating device:
    obtaining a first identifier identifying a first recipient device which can be communicated with directly over a network using the first identifier for providing the data thereto;
    obtaining a second identifier identifying a second recipient device such that an associated address can be found to enable the second recipient device to be communicated with directly over the network for providing the data thereto;
    sending the data and the second identifier to the first recipient device over the network via an intermediary server using the first identifier to enable the intermediary server to determine at least the second identifier and store a list comprising at least the second identifier, and to enable the first recipient device to determine the associated address from the second identifier and provide the data to the second recipient device using the associated address; and
    receiving an update from the intermediary server indicative of receipt of the data by the second recipient device.

2. The method according to claim 1, further comprising storing the list comprising at least the second identifier at the originating device, and updating the list at the originating device based on the update.

3. The method according to claim 1, wherein the data is provided to more than one second recipient device, and wherein the method further comprises updating the list for each update received until all second recipient devices have received the data.

4. The method according to claim 1, further comprising displaying information associated with the update.

5. The method according to claim 1, further comprising enabling the first identifier to be added to a communication comprising the data, enabling the second identifier to be added to the communication comprising the data, and sending the data to the first recipient device.

6. The method according to claim 2, wherein a global list is stored by the intermediary server and the update enables the originating device to update a local list, the global list and the local list identifying which recipients of the data have received the data.

7. A non-transitory computer readable medium comprising computer executable instructions for providing data, the computer readable medium comprising instructions for an originating device:
obtaining a first identifier identifying a first recipient device which can be communicated with directly over a network using the first identifier for providing the data thereto;
obtaining a second identifier identifying a second recipient device such that an associated address can be found to enable the second recipient device to be communicated with directly over the network for providing the data thereto;
sending the data and the second identifier to the first recipient device over the network via an intermediary server using the first identifier to enable the intermediary server to determine at least the second identifier and store a list comprising at least the second identifier, and to enable the first recipient device to determine the associated address from the second identifier and provide the data to the second recipient device using the associated address; and
receiving an update from the intermediary server indicative of receipt of the data by the second recipient device.

8. The non-transitory computer readable medium according to claim 7, further comprising instructions storing the list comprising at least the second identifier at the originating device, and updating the list at the originating device based on the update.

9. The non-transitory computer readable medium according to claim 7, wherein the data is provided to more than one second recipient device, and wherein the computer readable medium further comprises instructions for updating the list for each update received until all second recipient devices have received the data.

10. The non-transitory computer readable medium according to claim 7, further comprising displaying information associated with the update.

11. The non-transitory computer readable medium according to claim 7, further comprising instructions for enabling the first identifier to be added to a communication comprising the data, enabling the second identifier to be added to the communication comprising the data, and sending the data to the first recipient device.

12. The non-transitory computer readable medium according to claim 8, wherein a global list is stored by the intermediary server and the update enables the originating device to update a local list, the global list and the local list identifying which recipients of the data have received the data.

13. A method of providing data, the method comprising:
receiving the data at a first recipient device, the data having been sent directly over a network via an intermediary server using a first identifier, the data comprising a second identifier identifying a second recipient device such that an associated address can be found to enable the second recipient device to be communicated with directly over the network for providing the data, the data having been sent by an originating device over the network via the intermediary server to enable the intermediary server to determine at least the second identifier and store a list comprising at least the second identifier;
determining the associated address using the second identifier;
sending the data to the second recipient device using the associated address;
receiving acknowledgement of receipt of the data by the second recipient device; and
notifying the intermediary server of the acknowledgement to enable the intermediary server to provide an update to the originating device indicative of receipt of the data by the second recipient device.

14. The method according to claim 13, further comprising using the second identifier to determine if the first recipient device can communicate with the second recipient device.

15. The method according to claim 14, further comprising obtaining permission to obtain the associated address.

16. A non-transitory computer readable medium comprising computer executable instructions for providing data, the computer readable medium comprising instructions for:
receiving the data at a first recipient device, the data having been sent directly over a network via an intermediary server using a first identifier, the data comprising a second identifier identifying a second recipient device such that an associated address can be found to enable the second recipient device to be communicated with directly over the network for providing the data, the data having been sent by an originating device over the network via the intermediary server to enable the intermediary server to determine at least the second identifier and store a list comprising at least the second identifier;
determining the associated address using the second identifier;
sending the data to the second recipient device using the associated address;
receiving acknowledgement of receipt of the data by the second recipient device; and
notifying the intermediary server of the acknowledgement to enable the intermediary server to provide an update to the originating device indicative of receipt of the data by the second recipient device.

17. The non-transitory computer readable medium according to claim 16, further comprising instructions for using the second identifier to determine if the first recipient device can communicate with the second recipient device.

18. The non-transitory computer readable medium according to claim 17, further comprising instructions for obtaining permission to obtain the associated address.

19. A computing device operable to provide data, the computing device comprising a processor, a communication subsystem, and a memory, the memory comprising computer executable instructions for operating the processor to:
obtain a first identifier identifying a first recipient device which can be communicated with directly over a network using the first identifier for providing the data thereto;
obtain a second identifier identifying a second recipient device such that an associated address can be found to enable the second recipient device to be communicated with directly over the network for providing the data thereto;
send the data and the second identifier to the first recipient device over the network via an intermediary server using the first identifier to enable the intermediary server to determine at least the second identifier and store a list comprising at least the second identifier, and to enable the first recipient device to determine the associated address from the second identifier and provide the data to the second recipient device using the associated address; and receive an update from the intermediary server indicative of receipt of the data by the second recipient device.

20. A first recipient computing device operable to provide data, the first recipient computing device comprising a processor, a communication subsystem, and a memory, the memory comprising computer executable instructions for operating the processor to:

receive the data at a first recipient device, the data having been sent directly over a network via an intermediary server using a first identifier, the data comprising a second identifier identifying a second recipient device such that an associated address can be found to enable the second recipient device to be communicated with directly over the network for providing the data, the data having been sent by an originating device over the network via the intermediary server to enable the intermediary server to determine at least the second identifier and store a list comprising at least the second identifier;

determine the associated address using the second identifier;

send the data to the second recipient device using the associated address;

receive acknowledgement of receipt of the data by the second recipient device; and notify the intermediary server of the acknowledgement to enable the intermediary server to provide an update to the originating device indicative of receipt of the data by the second recipient device.

21. A method of enabling data to be provided, the method comprising an intermediary server in a network:

receiving data sent by an originating device to a first recipient device via the network using a first identifier, and a second identifier, the data having been sent directly over the network via the intermediary server using the first identifier, the second identifier identifying a second recipient device such that an associated address can be found by the first recipient device to enable the second recipient device to be communicated with directly over the network for providing the data thereto using the associated address;

determining at least the second identifier;

storing a list comprising at least the second identifier;

receiving acknowledgement of receipt of the data by the second recipient device; and providing an update to the originating device indicative of receipt of the data by the second recipient device.

22. The method according to claim 21, wherein the data is provided to more than one second recipient device, and wherein the method further comprises updating the list and providing an update to the originating device for each acknowledgement received until all second recipient devices have received the data.

23. The method according to claim 21, wherein a global list is stored by the intermediary server and the update enables the originating device to update a local list, the global list and the local list identifying which recipients of the data have received the data.

24. A non-transitory computer readable medium comprising computer executable instructions for enabling data to be provided, the computer executable instructions comprising instructions for an intermediary server in a network:

receiving data sent by an originating device to a first recipient device via the network using a first identifier, and a second identifier, the data having been sent directly over the network via the intermediary server using the first identifier, the second identifier identifying a second recipient device such that an associated address can be found by the first recipient device to enable the second recipient device to be communicated with directly over the network for providing the data thereto using the associated address;

determining at least the second identifier;

storing a list comprising at least the second identifier;

receiving acknowledgement of receipt of the data by the second recipient device; and providing an update to the originating device indicative of receipt of the data by the second recipient device.

25. An intermediary server operable to enable data to be provided, the intermediary server comprising a processor, a communication subsystem, and a memory, the memory comprising computer executable instructions for operating the processor to:

receive data sent by an originating device to a first recipient device via the network using a first identifier, and a second identifier, the data having been sent directly over the network via the intermediary server using the first identifier, the second identifier identifying a second recipient device such that an associated address can be found by the first recipient device to enable the second recipient device to be communicated with directly over the network for providing the data thereto using the associated address;

determine at least the second identifier;

store a list comprising at least the second identifier;

receive acknowledgement of receipt of the data by the second recipient device; and provide an update to the originating device indicative of receipt of the data by the second recipient device.

* * * * *